United States Patent
Wakileh et al.

(10) Patent No.: US 6,707,978 B2
(45) Date of Patent: Mar. 16, 2004

(54) FIBER OPTIC CABLE MANAGEMENT APPARATUS AND METHOD

(75) Inventors: George I. Wakileh, Chaska, MN (US); Frank E. Lowry, Prior Lake, MN (US); Chaouki A. Khamis, New Brighton, MN (US)

(73) Assignee: APA Cables & Networks, Inc., Plymouth, MN (US)

(*) Notice: Subject to any disclaimer, the term of this patent is extended or adjusted under 35 U.S.C. 154(b) by 0 days.

(21) Appl. No.: 10/332,591

(22) PCT Filed: Jul. 10, 2001

(86) PCT No.: PCT/US01/21708
§ 371 (c)(1),
(2), (4) Date: Jan. 10, 2003

(87) PCT Pub. No.: WO02/05002
PCT Pub. Date: Jan. 17, 2002

(65) Prior Publication Data
US 2004/0013387 A1 Jan. 22, 2004

Related U.S. Application Data

(60) Provisional application No. 60/217,133, filed on Jul. 10, 2000.

(51) Int. Cl.[7] ................................ G02B 6/00
(52) U.S. Cl. ........................ 385/134; 385/135
(58) Field of Search ................. 385/134–135

(56) References Cited

U.S. PATENT DOCUMENTS

| 5,066,149 A | 11/1991 | Wheeler et al. | 385/135 |
| 5,093,885 A | 3/1992 | Anton | 385/134 |
| 5,127,082 A | 6/1992 | Below et al. | 385/135 |
| 5,167,001 A * | 11/1992 | Debortoli et al. | 385/135 |
| 5,208,894 A | 5/1993 | Johnson et al. | 385/135 |
| RE34,955 E | 5/1995 | Anton et al. | 385/53 |
| 5,511,144 A | 4/1996 | Hawkins et al. | 385/135 |
| 5,513,293 A | 4/1996 | Holland et al. | 385/134 |
| 5,758,003 A | 5/1998 | Wheeler et al. | 385/134 |
| 5,898,129 A | 4/1999 | Ott et al. | 174/59 |
| 6,009,224 A | 12/1999 | Allen | 385/135 |
| 6,215,938 B1 | 4/2001 | Reitmeier et al. | 385/135 |
| 6,456,773 B1 * | 9/2002 | Keys | 385/135 |

OTHER PUBLICATIONS

ADC Telecommunication Catalog, Fiber Cable Management Products. Third Edition, Revision May, 1998 pp. 1–137.

* cited by examiner

Primary Examiner—Ellen E. Kim
(74) Attorney, Agent, or Firm—Kinney & Lange, P.A.

(57) ABSTRACT

A fiber distribution system (10) is used with cable and includes a plurality of frames (12) mounted in a side-by-side relationship with the interbay frame (12A, 12C) is mounted between each frame. At least one splice panel (16) a rear and first and second sides. The splice panel (16) includes a plurality of drawers (26) slidably mounted within the splice panel (16) with the panel and an open position extending from the front of the splice panel (16). There is an opening in the rear of the splice panel (16) for bolding cables for bolding splices between optical fibers forming the cable. A first take-up member (190) is movably mounted in each drawer. The first take-up member (190) is biased toward the second side of the drawer to slidably travel between a first position about in the center of the drawer and a second position adjacent the second side of the drawer.

19 Claims, 16 Drawing Sheets

FIBER OPTIC CABLE MANAGEMENT APPARATUS AND METHOD

BACKGROUND OF THE INVENTION

The present invention relates to various techniques, apparatus and methods for managing cable in centralized locations where multiple cables are terminated, spliced and stored, and is most specifically directed to the management of fiber optic cables. The cable management system of the present invention has particular application in the telecommunications industry with respect to fibers from equipment which interconnect with fibers from individual distribution cables in order to provide for the distribution and connection of optical fiber cables, and the management and storage of excess of cable lengths.

A fiber optic cable is typically formed from a plurality of optical fibers (e.g., 12), each of which has its own protective jacket. The fibers are bundled together within a larger protective jacket. Cable termination, splice and storage devices are known. Such devices typically include a distribution panel which provides a way to permanently connect each fiber from a trunk or equipment line to one end of an connector. A further fiber distribution cable is connected to the other end of the connector, for routing to a desired location. The device includes equipment for making such connections, called patch panels, and other equipment for making further connections, called splice panels, as well as various conduits, cable guides and cable storage bays. Because there are a large number of cables being connected and managed by such devices, it is crucial that the device provides a simple means for tracking and allowing ready access to the individual fibers of each cable and their respective connectors for maintenance or redistribution. The increased use of fiber optic cables in the telecommunication industry has led to the need for centralized fiber distribution systems with increased density. One problem associated with high-fiber density fiber distribution system is the need for enhanced management of cables and cable fibers in order to provide enhanced organization of the fiber optic cables carried on the device.

In addition, it is essential that excessive bending of fiber optic cables be avoided. Further, ready access to the various connections is essential, and increasing the density of the fiber distribution system may be problematic in maintaining the access for making changes to the fiber optic cable connections in use.

Previous apparatus for fiber optic distribution brought the outside equipment cables and interbay cables into a common management area or system, which made cable management cluttered and difficult. This in turn made cable identification difficult, as well as making access difficult. Such apparatus was relatively inflexible in design, with radius limiters for cable routing mounted in fixed positions.

A fiber optic distribution system is needed that provides high density connections, enhanced cable management and protection, and improved techniques for cable routing and tracking.

BRIEF SUMMARY OF THE INVENTION

The present invention relates to a fiber distribution system including a plurality of frames mounted in a side-by-side relationship with the frames adapted to house a plurality of fiber distribution panels. An interbay frame is mounted between each frame. At least one splice panel is adapted for mounting within the frame and each splice panel has a front, a rear and first and second sides. The splice panel includes a plurality of drawers slidably mounted within the splice panel with the drawers being slidable between a closed position fully within the splice panel and an open position extending from the front of the splice panel. There is an opening in the rear of the splice panel for admitting cables into the drawers. At least one splice tray is disposed within each drawer for holding splices between optical fibers forming the cable. A first take-up member is movably mounted in each drawer. The first take-up member is biased toward the second side of the drawer to slidably travel between a first position about in the center of the drawer to allow cable slack when the drawer is in the open position and a second position adjacent to the second side of the drawer to take up cable slack when the drawer is in the closed position.

BRIEF DESCRIPTION OF THE DRAWINGS

The present invention will be further explained with reference to the drawings figures listed below, wherein like structure is referred to by like numerals throughout the several views.

DETAILED DESCRIPTION

Figure 1:
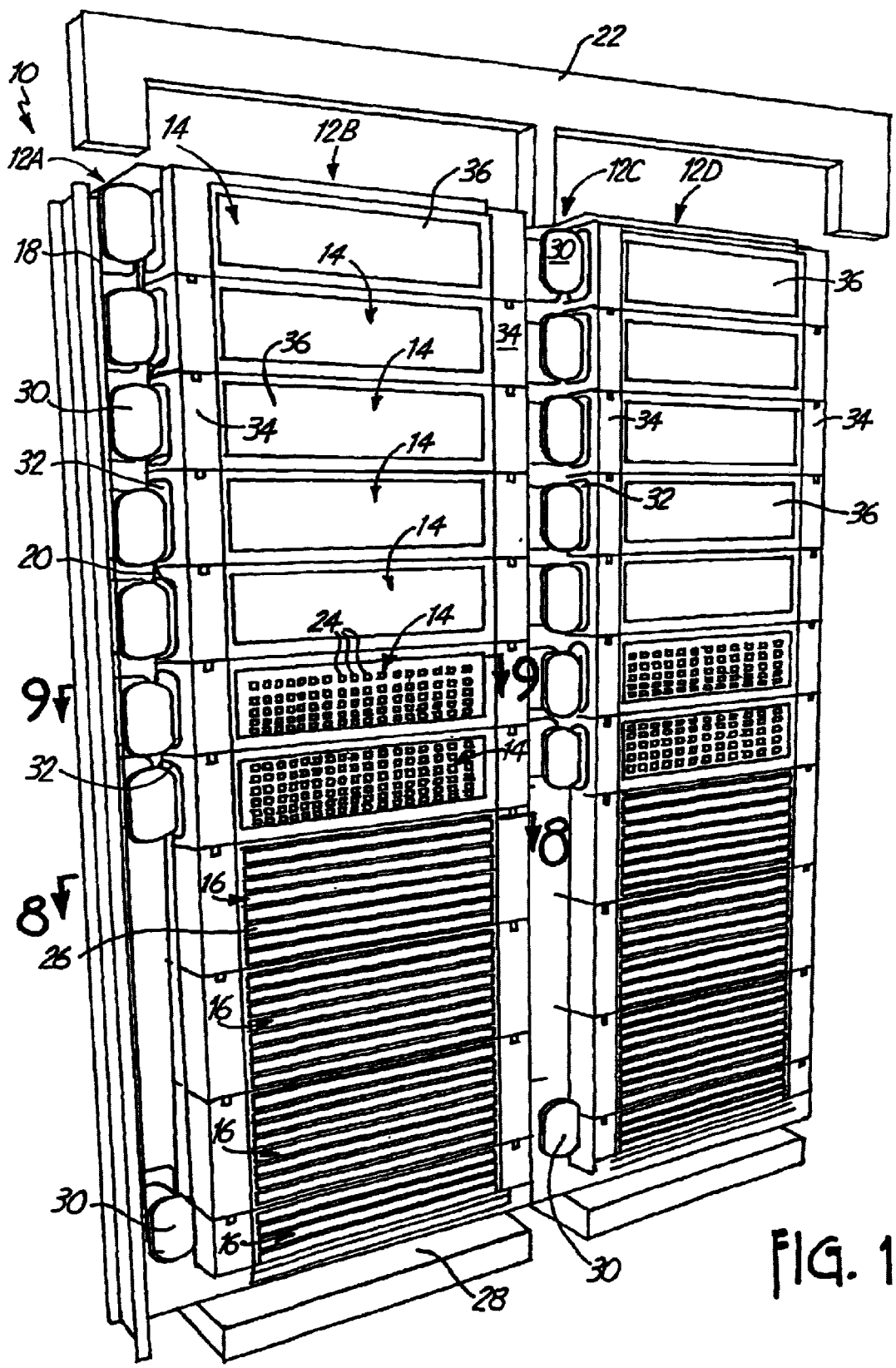
FIG. 1 is a front perspective view of a fiber distribution system of the present invention.

FIG. 1 is a front view a fiber distribution system 10 of the present invention. The fiber distribution system includes one or more cable management frames 12, which are preferably secured together. FIG. 1 illustrates this concept, showing two fiber distribution frames 12B and 12D and two cable management interbay frames 12A and 12C mounted in a side-by-side relationship. Each fiber distribution frame includes vertically stacked fiber distribution modules or panels, or it may serve as a spacer or cable slack take-up bay between two other frames. The frames 12B and 12D include a plurality of vertically aligned patch panels 14 and splice panels 16. Interbay frames 12A and 12C provide a channel for cables 18 traveling into and from the panels, and allows orderly slack take-up of cables extending between the frames 12.

Fiber optic cables extend between the various frames through a lower or overhead troughs. Each fiber optic cable 18 is composed of a plurality of optical fibers 20 (e.g., 12 fibers). In cross-connect cable management configurations of the type shown in FIG. 1, cable from external equipment preferably enters the system 10 from an overhead trough 22, is run along the back side of one of the frames 12 and is then directed to one of the splice panels 16 on that frame. Within the splice panels 16, each fiber in the cable is spliced to another fiber which is then diverted along the back of that frame to the back of an adapter 24 on one of the patch panels 14. Preferably a connector is attached to the end of each fiber and used to connect the fiber to the adapter 24. Fibers connected to the front of that adapter 24 (which is readily accessible from the front of the panel) may be run on the front side of the system frame to the front of a second adapter 24 on an alternative patch panel 14 (on the same or on an alternative frame) for coupling thereto. From the back of that second adapter 24, a fiber runs on the back side of the fiber distribution frame to another splice panel 16. In the second splice panel 16 the fiber is spliced to another fiber in a cable which then runs from the backside of the system to the exterior of the system 10 for connecting to customer equipment. One example of the frame 12B loaded with fiber distribution panels is shown in FIG. 1. In the frame 12B, four splice panels 16 are mounted to the frame 12A, along with seven patch panels 14. Preferably, each splice panel 16 has eight slidably mounted splice drawers 26 for use in splicing optical fibers from external cable to the optical fibers from cables connected to adapters 24 on the patch panels 14. However, some splice panels 16 may have four splice drawers 26 for splicing optical fibers. Each patch panel 14 of the illustrated embodiment preferably has 96 adapters 24. However, some patch panels 14 may have 144 or 216 adapters 24. The splice panels 16 and the patch panels 14 of the present invention are discussed in more detail below. One skilled in the art will recognize that alternative arrangements of the patch panels 14 and the splice panels 16 on a particular frame 12 are possible, and may be widely varied at the discretion of the user. The frames 12 and cable management panels 14 and 16 are preferably made of steel.

The present invention permits cable to enter the splice drawers from either side or both sides of the splice panel for all splice drawers and protects the cable from bending and thereby damaging the optical fiber. The splice drawers of the inventive splice panels can accommodate cable entry and exit from either side of the drawer, thereby making cable management and routing much easier and simpler. Furthermore, there is a sliding slack take-up arrangement provided in each drawer for taking up excess cable within an individual splice drawer while retaining and preventing the cable from bending to a degree which would otherwise damage the optical fiber.

In the fiber distribution system 10 shown in FIG. 1, an overhead trough 22 and a ground level trough 28 carry cables 18 to the system 10. Radius limiters 30 are mounted within the interbay frames 12A and 12C on the front of the system 10. The radius limiters 30 are provided for radius protection of the cable 18 as it bends toward the panels. The individual fibers 20 traveling through the interbay frames are typically going from a front adapter 24 on one patch panel 14 to a front adapter 24 on another patch panel 14 on the same or in an alterative frame 12. The patch panels 14 include openings 32 between the interbay frames 12A and 12C and the inside of the patch panels 14 to allow the fibers 20 to enter and exit the patch panel 14.

Each patch panel 14 and splice panel 16 has two side doors 34 on the front of the panel and on either end of the front of the panel. The side doors 34 open to reveal a front cable channel (not shown) carrying fibers 20 between path panels 14 and frames 12. Also located on the front of each patch or splice panel is a front cover 36. Preferably, the front cover 36 is transparent or translucent so that the adapters 24 within the patch panel 14 or drawers 26 in the splice panels 16 may be viewed by an operator from the front of the system 10. In some embodiments of the patch panel 14, a designation card used to identify each adapter 24 in the circuit is hung on the inside of the front cover 36. However, some front covers 36 may be opaque, as shown in FIG. 1. Additionally, some panels are shown without front covers to illustrate the inside of the panels.

Figure 2:
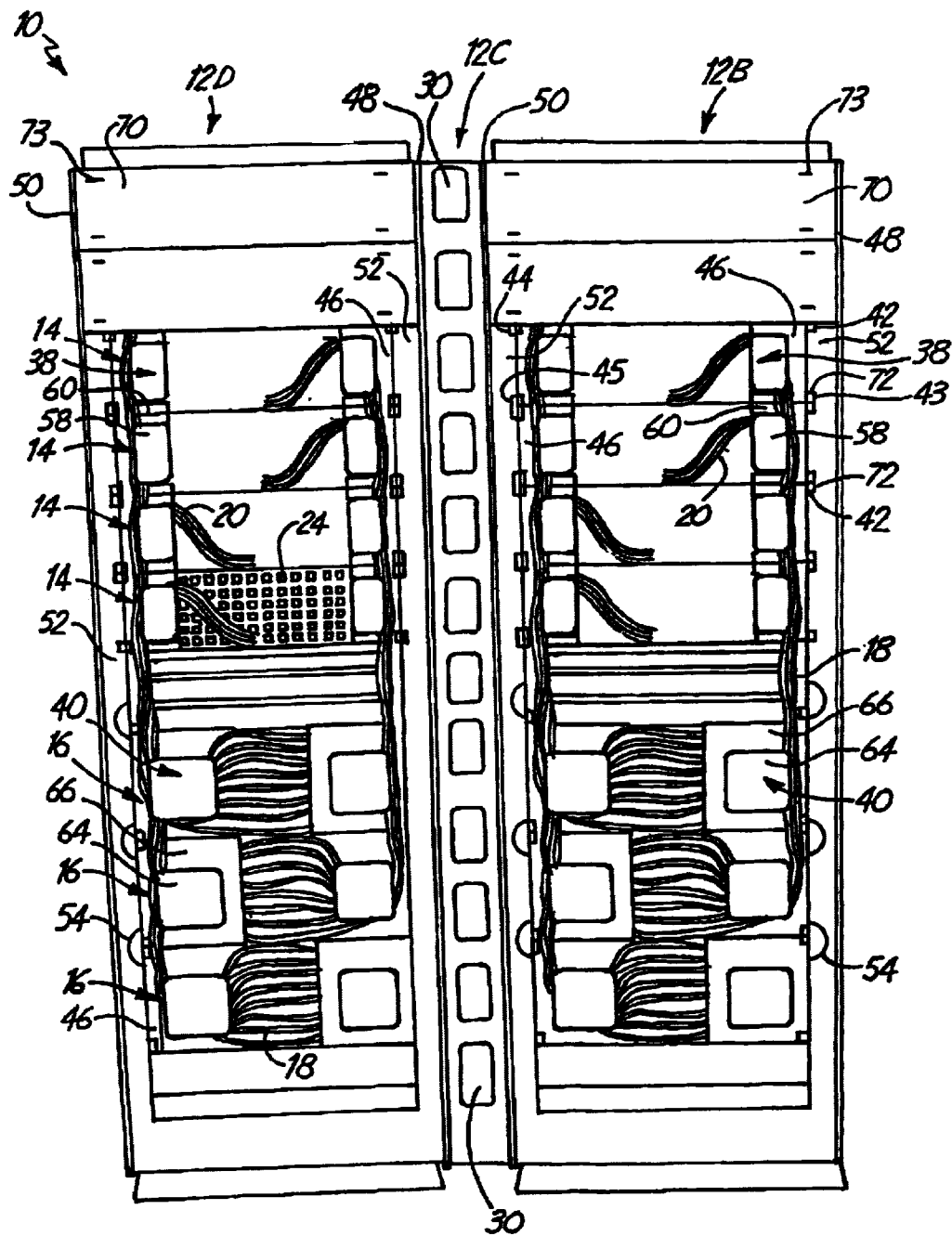
FIG. 2 is a rear perspective view of the fiber distribution system of the present invention.

FIG. 2 is a rear view of the fiber distribution system 10 shown in FIG. 1, including the rear of the frames 12B and 12D, the interbay frame 12C, and the cable management panels 14 and 16. Radius limiters 38 are attached to the rear of the patch panel 14 and radius limiters 40 are attached to the rear of the splice panel 16. Radius limiters 38 and 40 protect the cable 18 as it is guided into the panels and prevents damage to the optical fibers 20 bundled within the cables.

The back of each patch panel 14 and splice panel 16 has a first upper rear extension 42, a first lower rear extension 43, a second upper rear extension 44 and a second lower rear extension 45. The radius limiters 38 and 40, in conjunction with the rear extensions 42, 43, 44 and 45, define two vertical inner cable channels 46. The inner cable channels 46 provide a path for cable 18 traveling between the patch panels 14 and the splice panels 16. A first rear side extension segment 48 and a second rear side extension segment 50 extend from the back of the frame 12B to form the outer side walls for the frame. The rear extensions 42, 43, 44 and 45 of the panels and the rear side extension segments 48 and 50 of the cable management frame 12 define two vertical outer cable channels 52. The outer cable channels 52 provide a path for the cable 18 connecting the splice panels 16 of the frame to customer panels or equipment (not shown). Radius limiters 54 are positioned within the outer channels 52 to provide radius protection of the cable 18 as it makes its entry from the outer cable channels 52 to the splice panels 16.

The radius limiters 38, 40 and 54 are provided on the back of the frames to prevent excessive bending of the fiber optic cable (such bending would increase signal loss or damage the optical fibers within the cable). The radius limiter 38 is comprised of a half tube, or semicircular tube, having a cap 58. The radius limiter 38 is attached to a base 60 and the base 60 is mounted to the back of the patch panel 14. The radius limiter 40 is comprised of a cylindrical tube having a cap 64. The radius limiter 40 is attached to a base 66 and the base 66 is mounted to the back of the splice panel 16. The radius limiter 54 is comprised of a half tube, or semicircular tube. The radius limiter 54 is mounted to the back of the frame 12B within the outer cable channel 52 and adjacent the splice panels 16. The radius limiter 54 is provided to direct cable 18 in and out of the splice panels 16, via the radius limiters 40. The radius limiters 54 may attentively be placed relative to the radius limiters 40 and splice panels 16.

The radius limiters 38, 40, and 54 serve to facilitate fiber optic cable management as cable 18 comes to and from the inventive system 10 from external equipment, as well as between the associated frames 12A, 12B, 12C, and 12D, and also between panels within a particular frame, such as between splice panel 16 and patch panel 14 of a particular frame. As can be appreciated by one of ordinary skill, any number of configurations are possible for the radius limiters, so long as the bend radius for the cable 18 is not made too severe. The radius limiters may also be provided with a plurality of holes, slots or other means for use in affixing cable tie-downs or lacing thread to the cables 18 and the radius limiters. Such attachment means are further preferably aligned with adapter rows (on patch panels 14) or splice drawers 26 (on splice panels 16). The radius limiters are preferably made of a plastic material.

As mentioned above, a pair of outer cable channels 52 are defined along each back side of a frame, such as frame 12B. Outer cable channels 52 provide an outer cable path for cable 18 coming and going to external equipment inner cable channels 46 provide an inner path primarily for passage of cable 18 between panels in the same frame. In any event, cable 18 coming and going from either inner cable channels 46 or outer cable channels 52 and into or from one of the splice panels 16 or patch panels 14 run over one or more of the radius limiters 38, 40, or 54 to prevent kinking and excessive bending of the sensitive fiber optic cable. The caps 58 and 64 on the radius limiters 38 and 40, respectively, retain the cable 18 in position about those radius limiters.

A rear cover 70 is attached to the back of each splice panel 16 and patch panel 14. Each rear extension 42, 43, 44 and 45 has an aperture 72 which is adapted for receiving a suitable fastener 73 used for mounting the rear cover 70 onto the panel. The rear covers 70 enclose the back of the panels as well as the outer cable channels 52. The rear covers 70 protect the cables and panels from damage. Preferably, the rear covers 70 are opaque, however they may also be transparent or translucent to better see within the panels.

The inner and outer channel network (a pair of channels running vertically along the two rear sides of each frame) allows for significantly improved cable routing and protection, and hence a superior fiber distribution system. This effect is further heightened by the inventive splice panel configuration, which facilitates entry of fiber optic cable into the rear of the splice panel from either side, as explained below. This feature adds versatility in that cable running to and from the splice panel can run up and down either side of the back of the frame upon which the splice panel is mounted. This lessens the cable clutter on the back of the frame, which was a problem in prior splice panel structures where all cable entered/exited along only one side of the rear of the splice panel. Likewise, fibers can run to and from the patch panels from either side of the back of each patch panel, and then along the interbay cable channels to other splice or patch panels on the frame.

The inventive splice panel configuration also has a dual entry design which facilitates entry of fiber optic cable into the rear of the splice panel from both sides. Dual entry of cable is a feature that allows fiber optic cable to enter from either side of the frame into the rear of the splice panel, thus significantly improving cable routing options in the back of the panel and throughout the frame. Dual entry provides additional benefit over prior art splice panels in that it lessens cable cluster on one side of the panel.

Figure 3:
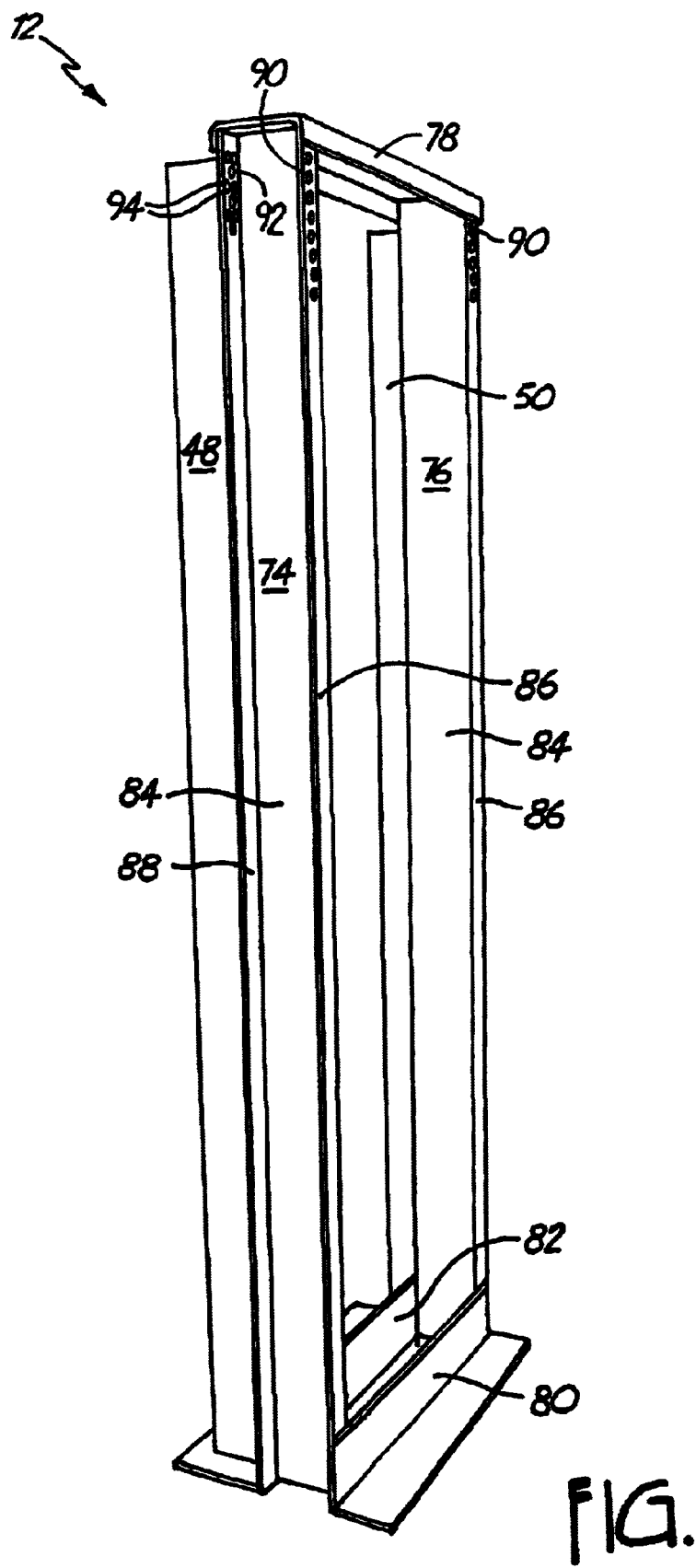
FIG. 3 is a front perspective view of an assembled mounting frame of the present invention.

FIG. 3 shows a front perspective view of an assembled mounting frame for supporting patch panels 14 and splice panels 16. The frame is preferably made of steel (0.120" and 0.188" thick). The frame 12B is formed by a pair of parallel opposed and identical vertical members 74 and 76. The vertical members 74 and 76 are secured together at the top by a "U-shaped" top cap 78 and at the bottom by a pair of "L-shaped" floor angles 80 (front) and 82 (rear). A top front extension (not shown) may be attached to the top cap 78. As best seen by the vertical member 74 each vertical member 74 and 76 is "C-shaped," with a central side segment 84, front segment 86 and rear segment 88. Attached to the outer end of the rear segment 88 is a rear side extension segments 48 or 50, which extend generally parallel to central side segment 84. The extension segments 48 and 50, when the frame is loaded with splice and patch panels, create outer cable channels 52 for management of equipment cables that is separate from the inner cable channels 46.

The vertical members 74 and 76 of the frame 12B are provided with a plurality of fastening apertures 90 on the front segments 86 of each vertical member 74 and 76 for use in attaching the vertically stacked fiber distribution panels. A plurality of fastening apertures 92 are provided on the rear segment 88 of each vertical member 74 or 76 for use in mounting radius limiters 54, as described above. Paired slots 94 are also provided on the rear segment 88 of the vertical members 74 and 76 for use in cable management The slots 94, as well as hook and loop straps are provided on the rear of the frame for fastening cables to the frame.

Figure 4:
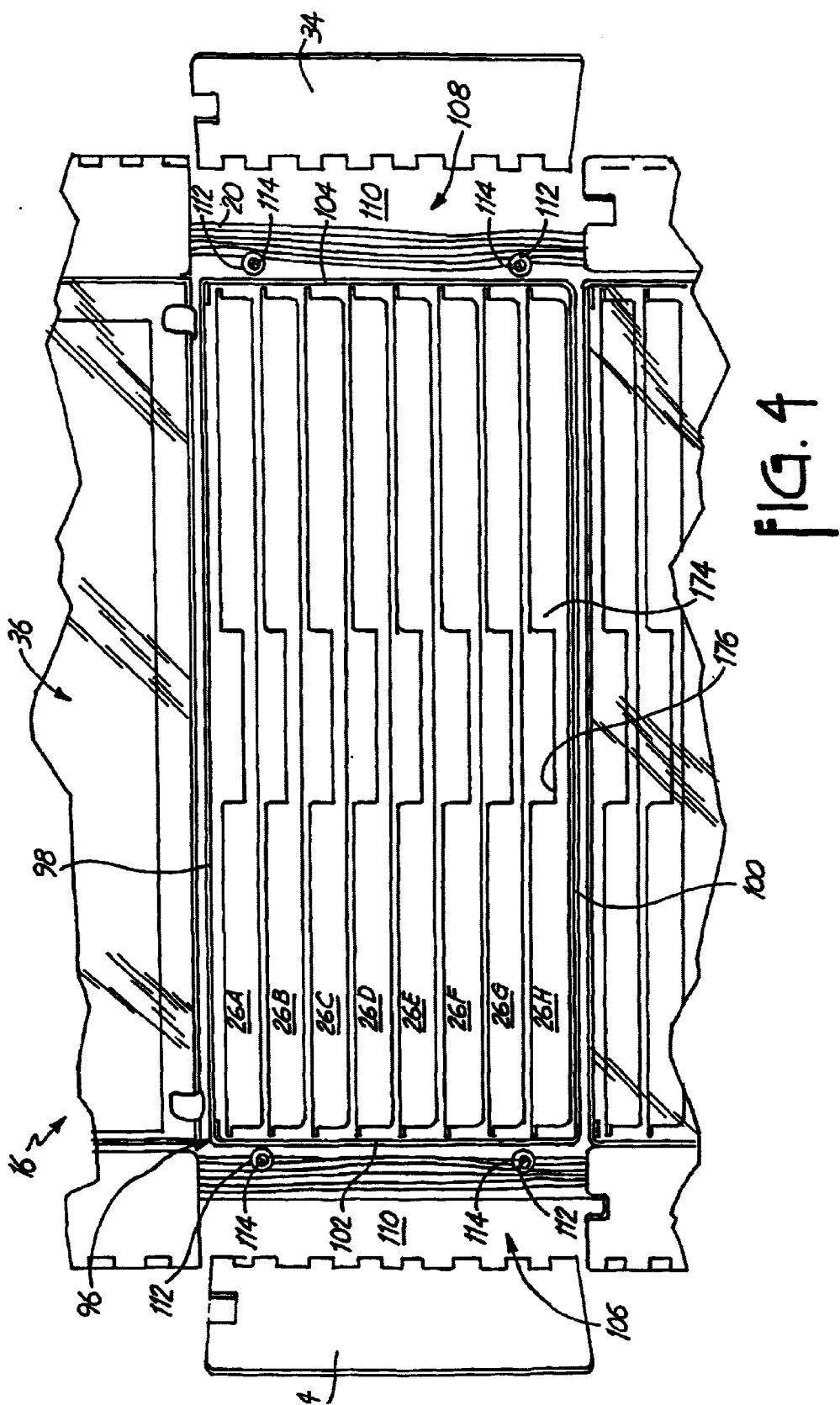
FIG. 4 is a front view of a splice panel of the present invention.

FIG. 4 is a front view of one splice panel 16 mounted within the frame 12B with the front cover 36 removed. Each splice panel 16 has a frame 96 or chassis, which includes splice drawers 26 slidably mounted within the chassis 96, (such as drawers 26A–26H), although more or less drawers may be provided. The chassis 96 of the splice panel 16 has a top 98, bottom 100 and side walls 102 and 104. Preferably, there are eight splice drawers in the splice panel 16

In FIG. 4, each splice drawer 26 is retracted into its closed storage position. Each individual splice drawer is slidably moveable on a slide runner or slide chassis assembly, as is known. Each side wall 102 and 104 of the splice panel has a plurality of tabs thereon to accommodate the slide chassis or tracks (not shown) for each of the drawers 26. Each splice drawer is slidably mounted between a closed storage position, where the drawer is fully retained within the chassis, and an open use position, where the drawer is slid out of the chassis for access to the splice tray thereon. This arrangement provides a fairly dense and compact structure for mounting the splice drawers in the system, and also for allowing user access to the splice trays within each splice drawer.

Each of the splice drawers 26 may carry one or more splice trays (not shown) which are used for holding the splices between optical fibers. In use, the drawer 26 is pulled out of the chassis 96 by a user to obtain access to the splice tray. Thus, there must be sufficient slack in the optical fiber cable 18 leading to each drawer 26 to allow the back and forth movement of the drawer 26 within the chassis 96. Unmanaged, this additional or excess cable 18 (necessary to allow movement) can impede movement of that drawer or other drawers, or may be susceptible to kinking to such a degree that the optical fibers in the cable may be damaged. Slack take-up members, as discussed below, are mounted within the splice drawers to take up the excess cable 18 and prevent damage to the optical fibers in the cable.

Figure 8:
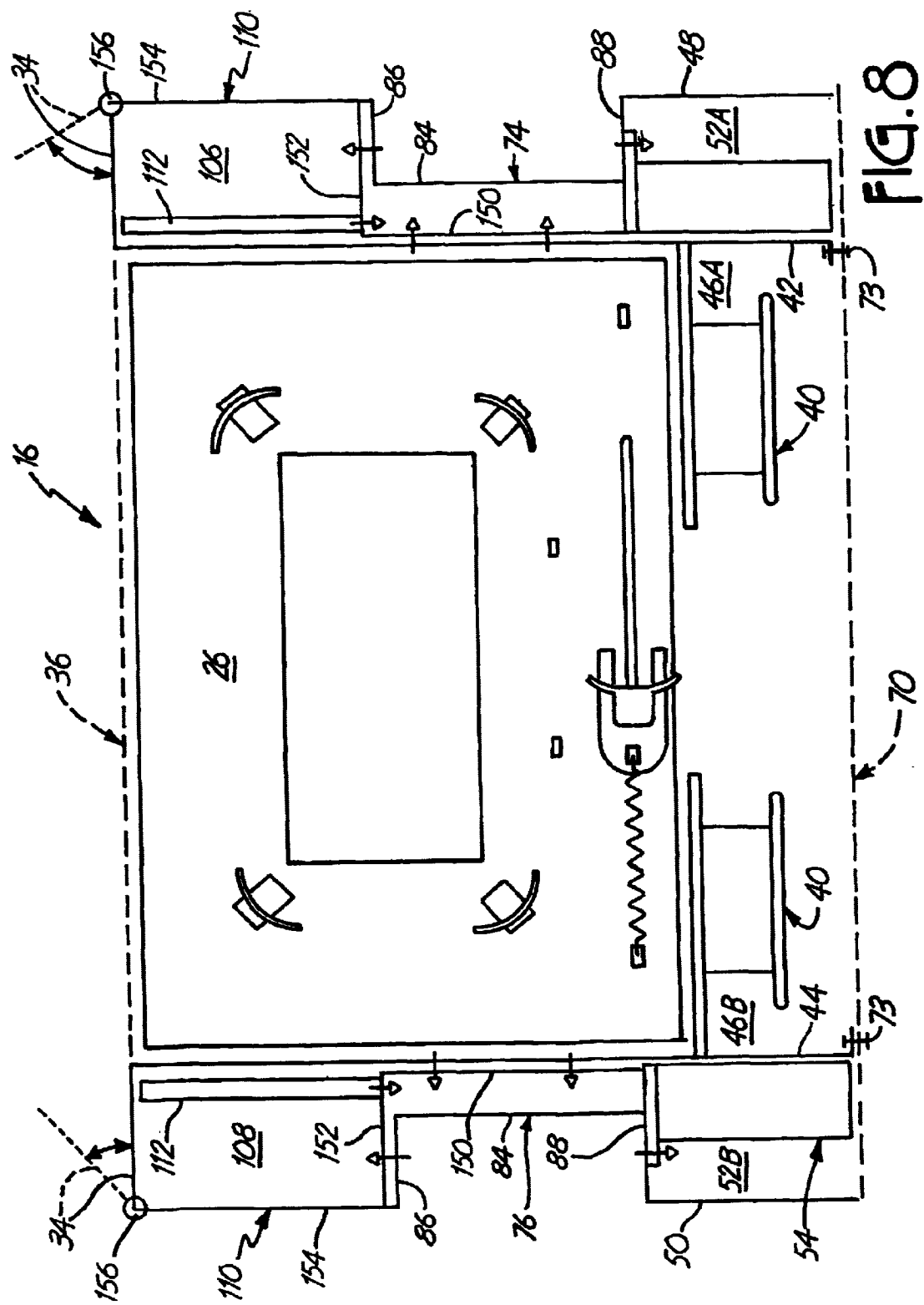
FIG. 8 is a sectional view of the splice panel as taken along lines 8—8 in FIG. 1.

In FIG. 4, the side doors 34 are open to reveal two vertical front cable channels 106 and 108. A splice panel mounting bracket 110, as described with respect to FIG. 8, is attached to each side wall 102 and 104 of the chassis 96 of the splice panel 16. The splice panel mounting brackets 110 define the front cable channels 106 and 108. The front cable channels 106 and 108 provide a path for optical fibers 20 traveling through the front cable channels 106 and 108 between patch panels 14.

Each mounting bracket 110 has at least two cable guide pins 112 mounted adjacent the sidewall of the chassis 96. The outer free end of each pin 112 has a magnetic catch 114, or other suitable means, for holding the side doors in the closed position. The side doors 34 are mounted by a hinge (not shown) to the mounting brackets 110 and are selectively retained in the closed position by the magnetic catches 114, or other suitable means. Additionally, the cable guide pins 112 are rounded and further provide guide means for guiding the optical fibers 37 through the front cable channels 106 and 108. Although the front cover 36 is removed in FIG. 4, the front cover 36 is preferably mounted to the bottom 100 of the chassis 96 and is selectively retained in its closed position by suitable fasteners.

Figure 5:
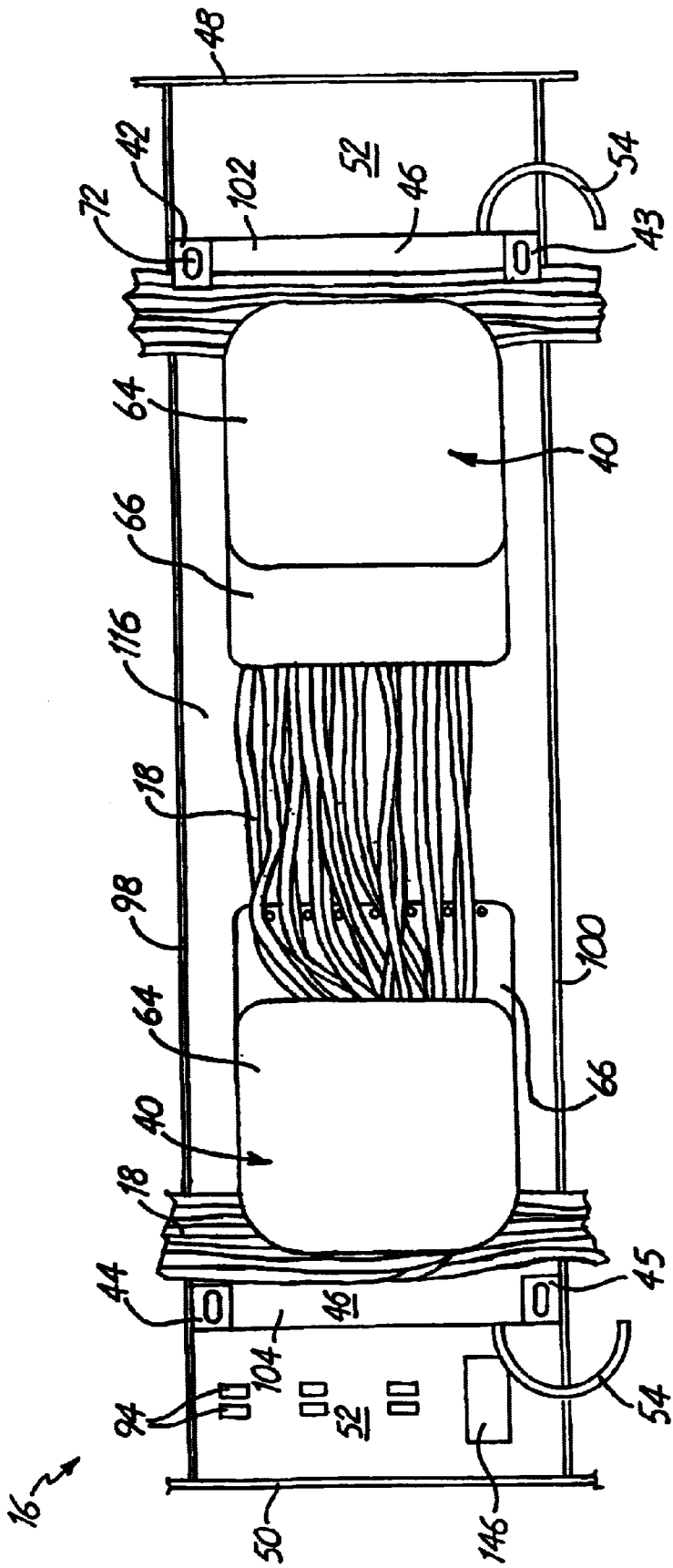
FIG. 5 is a rear view of the splice panel of the present invention.

FIG. 5 is a rear view of one slice panel 16 mounted within the frame 12B with the rear cover 70 removed. The base 66 of one radius limiter 40 is mounted to the back of the chassis 96 adjacent the first sidewall 102 of the splice panel 16, while another radius limiter 40 is mounted to the back of the chassis 96 adjacent the second sidewall 104 of the splice panel 16. The cable 18 travels within the inner cable channels 46 or the outer cable channels 52, around the radius limiter 40 and into one splice drawer 26. Although in FIG. 5, the cable 18 is shown entering the splice drawers 26 from the left side of the splice panel 16, the cable 18 may also enter the drawers 26 from the right side.

A rear opening 116 is formed in the back of the chassis 96 of the splice panel 16 and allows cable 18 to enter and exit the splice panel. Cables can pass through the rear opening 116 and into each drawer 26 of the splice panel 16. The bases 66 of radius limiters 40 define back walls on the back side of the splice panel 16 with the rear opening 116 defined therebetween. The paired slots 94 on the vertical members 74 and 76 of the frame 12B are provided to accept double sided hook and loop mechanical fastener strips 146, which can be positioned at selective locations along the vertical members for use in cable tie-down and management.

As mentioned above, cable from external equipment typically enters the system from an overhead trough. The cable is then directed down the back side of the system to a termination point (often a splice tray). Prior art splice panels only permitted entry of cable into the backs of the splice drawers from one side for all of the drawers in each splice panel. This configuration resulted in all of the external cable extending along one side of the rear of the frame for each splice panel, which presented cable management and tracking problems. The present invention permits entry of cable into the backs of the splice drawers from either side, or both sides, for all the drawers in each splice panel.

Figure 6:
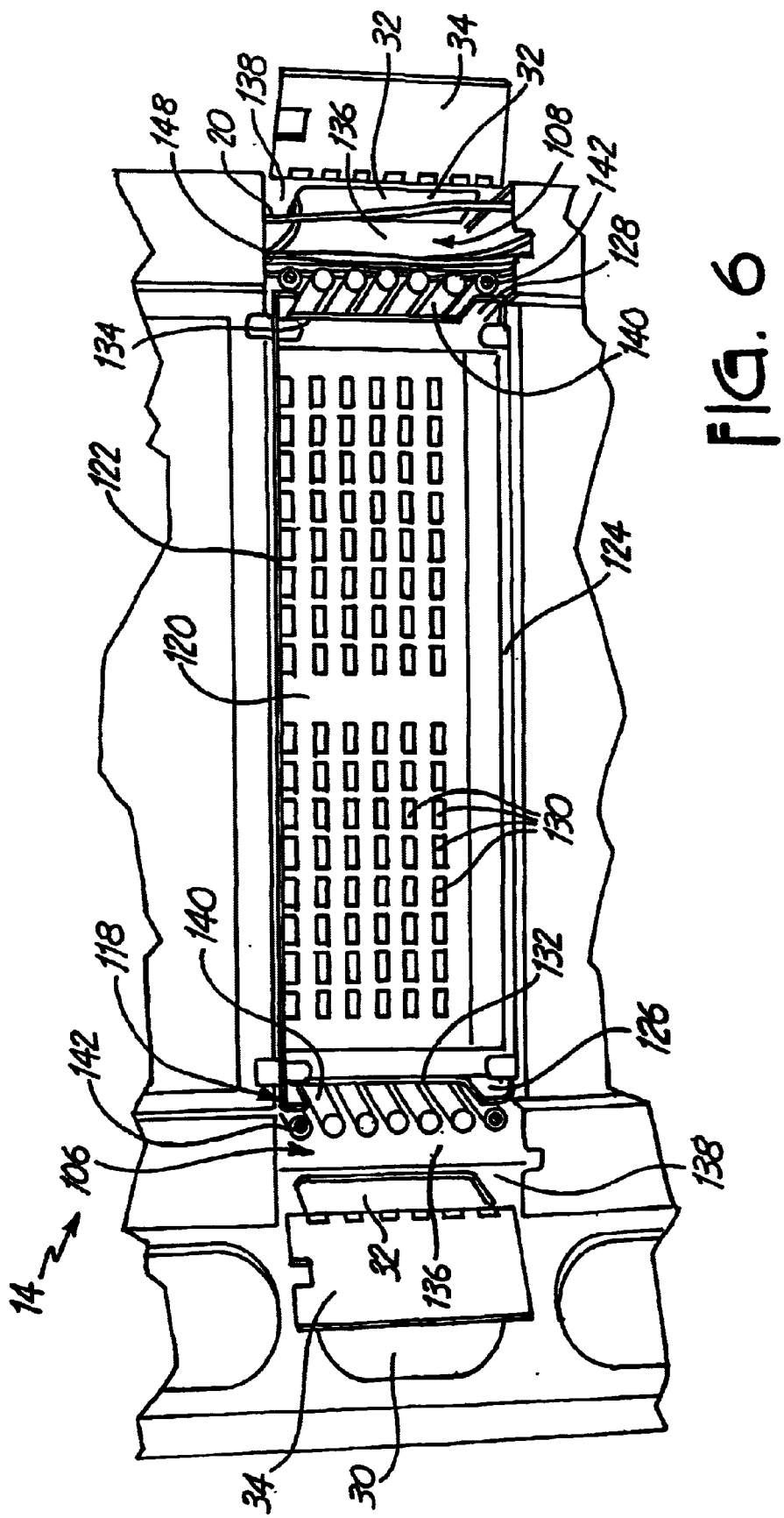
FIG. 6 is a front view of a patch panel of the present invention.

FIG. 6 is a front view of one patch panel 14 mounted within the frame 12B with the front cover 36 removed. Each patch panel 14 has a frame 118, or chassis, which includes the plurality of optical fiber adapters 24. The patch panel 14 includes the chassis 118 having a adapter support plate 120 for mounting the adapters 24. Each individual patch panel 14 includes the chassis 118 with a top 122, a bottom 124 and sidewalls 126 and 128. The adapter support plate 120 extends between and is supported by side walls 126 and 128. The adapter support plate 120 has a plurality of apertures 130 formed for retention of the adapters 24.

Each adapter 24 receives separate optical fiber from the back side and the front side to connect the two optical fibers together. One embodiment of the patch panel 14 includes 96 adapters, arranged in two side-by-side batches of 48 adapters, each batch with six rows and eight columns of adapters 24. Other embodiments of the patch panel 14 may include fewer or more adapters. Each patch panel 14 also includes various means for securing the optical fibers and cable in place while preventing excessive bending thereof in order to avoid damaging the optical fibers.

As illustrated in FIG. 6, the side walls 126 and 128 of the chassis have a cable access opening 132 and 134, respectively, forward of the adapter support plate 120 adjacent the front of the chassis 118. Each opening 132 and 134 may have its edges lined with a polymer liner to further protect the cable 18 and optical fibers 20 passing from damage. Alternatively, a plurality of generally parallel horizontal slots may be formed in the sidewalls 126 and 128 adjacent the front edge of the chassis 118, with preferably a slot on each side corresponding to each row of the adapters 24.

Figure 9:
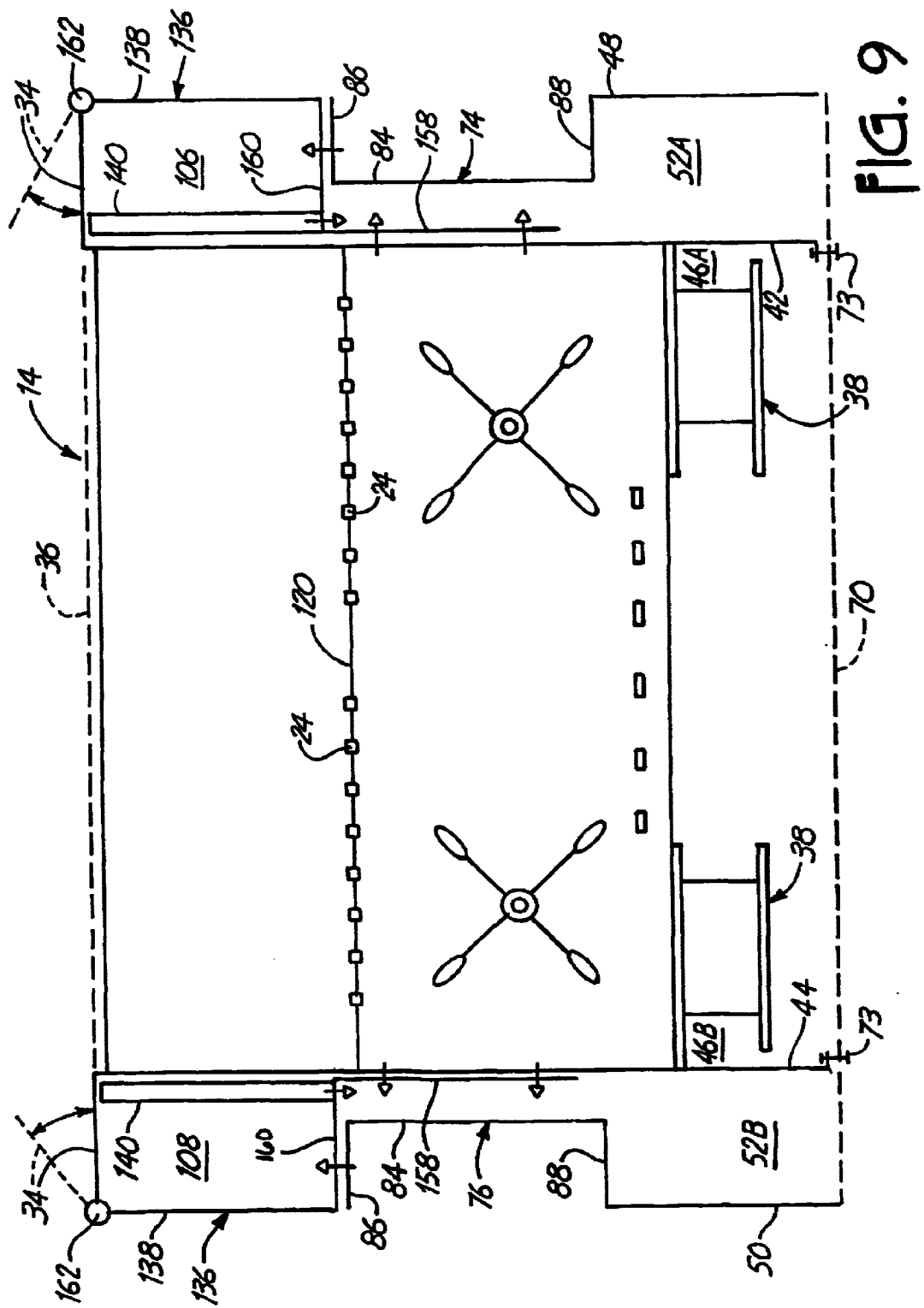
FIG. 9 is a sectional view of the patch panel as taken along lines 9—9 in FIG. 1.

A patch panel mounting bracket 136, as described with respect to FIG. 9, is mounted adjacent to each of the side walls 126 and 128 of the chassis 118 of the patch panel 14. The mounting bracket 136 defines the front cable channels 106 and 108. The front cable channels 106 and 108 provide a path for optical fibers 20 traveling between patch panels 14. Furthermore, the opening 32 is formed in a channel defining segment 138 of the bracket 136, discussed below.

A plurality of pins 140 are mounted to each mounting bracket 136 adjacent the openings 132 and 134 in sidewalls 126 and 128. The pins 140 are rounded and provide guide means for guiding the cable 18 to and from the adapters 24 on the front side of the adapter support plate 120, through the openings 132 and 134, and into the front cable channels 106 and 108. In the illustrative embodiment, seven pins 140 are shown, with the top and bottom pins 140 bearing a magnetic catch 142 on its outer free end. Preferably one pin 140 is mounted to each mounting bracket 136 for each row of adapters 24 so that each pin defines an opening for the cable 18 entering the patch panel 14 to better facilitate routing and protection of the cable.

The side doors 34 are mounted by a hinge (not shown) to a mounting bracket 136 and each door is selectively retained in its closed position by the magnetic catches 142, or other by suitable fasteners. From the front of the adapter 24, the optical fiber 20 exits the patch panel along the sides thereof, through the opening (132 or 134) and over an associated cable management pin as it travels through the front cable channel to the front of another adapter on another patch panel. The front cable channels 106 and 108 provide a path for optical fibers 20 traveling through the front cable channels 106 and 108 between patch panels 14.

Figure 7:
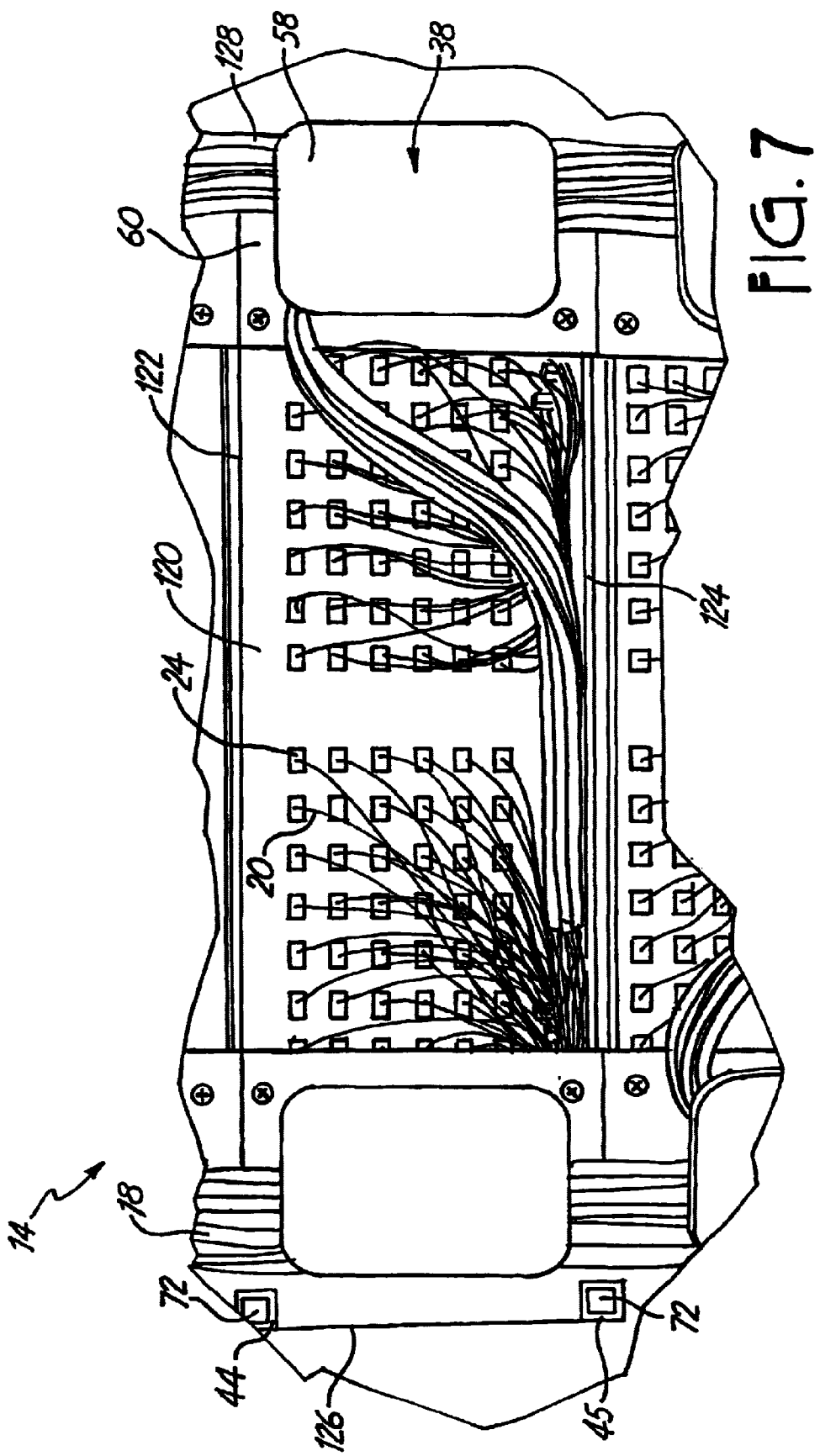
FIG. 7 is a rear view of the patch panel of the present invention.

FIG. 7 is a rear view of one of the patch panels 14 mounted to the frame 12B with the rear cover 70 removed. The base 60 of one radius limiter 38 is mounted to the back of the chassis 118 adjacent the first sidewall 126 of the patch panel 14, while another radius limiter 38 is mounted to the back of the chassis 118 adjacent the second sidewall 128 of the patch panel 14. The cable 18 travels within the inner cable channels 46, around the radius limiter 38 and into the patch panel 14 where the optical fibers 20 are connected to individual adapters 24.

In addition to the cable management features mentioned above, the inventive fiber distribution system also includes tabs 144 at selected locations on the patch panels 14 and splice panels 16 for cable tie-downs to be affixed thereto, or for cable dips to be mounted thereon. The paired slots 94 on the vertical members 74 and 76 of the frame 12B are provided to accept double sided hook and loop mechanical fastener strips, which can be positioned at selective locations along the vertical members for use in cable tie-down and management.

The present invention provides a novel solution to the problem of cable entering the splice drawers from one side of the splice panel for all drawers. The splice drawers of the inventive splice panels 16 can accommodate cable entry and exit from either side of the drawer, thereby making cable management and tracking much easier and simpler.

FIG. 8 is a sectional view of the splice panel 16 taken along line 8—8 of FIG. 1, and FIG. 9 is a sectional view of the patch panel 14 taken along line 9—9 of FIG. 1. As seen in FIGS. 2, 8, and 9 outer cable channels 52 extend along the back left and right corners of the frame 128. The outer cable channel 52A (at the rear right corner of the back of the frame) is defined in part by rear side extension segment 48, the rear segment 88 of the vertical member 74, and the first rear extensions 42 and 43 of the panel. The outer cable channel 52A may be further defined by at least one radius limiter 54 mounted by suitable fasteners to the rear segment 88 of the vertical member 74 (the fastening of radius limiters 54 is done in apertures 92 on both vertical members 74 and 76). The outer cable channel 52B (at the left rear corner of the back of the frame) is defined in part by rear side extension segment 50, the rear segment 88 of the vertical member 76, and the second rear extensions 44 and 45 of the panel. The outer cable channel 52B may be further defined by at least one radius limiter 54 which is preferably secured by suitable fasteners to the rear segment 88 of the vertical member 76. Thus, a vertical outer cable channel (52) is defined adjacent each rear corner of the frame 12B.

The outer cable channels 52 (on both sides) are for the reception of cables running to or from external equipment, into the frame 12B and into one of the splice drawers 26 on the splice panel 16. Such a cable would emend, for example, from the top of outer cable channel 52A, past one or more of the radius limiters 54 and then over (or under) the radius limiter 40 mounted on the back of the splice panel 16, before entering the splice drawer 26. Cable running to or from external equipment likewise can follow a similar path via outer cable channel 52B. Excess cable may be coiled about the radius limiter 40 as it traverses its path from splice panel 16 to or from external or customer equipment via outer cable channels 52.

Cables extending internally within the frame 12B traverse inner cable channels 46. The inner cable channels 46 run generally parallel to the outer cable channels 46, but are spaced inwardly from each side of the frame 12B. The inner cable channel 46A is defined in part by the radius limiters 38 and 40 mounted on the rear sides of the patch panels 14 and the splice panels 16, respectively, and the first rear extension 42 and 43 of the panels. The inner cable channel 46B is also defined in part by the radius limiters 38 and 40 as well as the second rear extensions 44 and 45. The inner cable channels 46 may be further defined by the radius limiters 54 mounted within the outer cable channels 52.

The internal path for cable 18 along the back of the frame 12B runs from the splice drawer 26 in the splice panel 16 to the adapters 24 on one of the patch panels 14, or vice versa. The cable 18 leaves the drawer 26 of the splice panel 16 through the rear opening 116 in the back of the splice panel 16, extends about the radius limiter 40 and runs vertically (up or down) and over the radius limiter 38 of the desired patch panel 14. The cable 18 then enters the rear of the patch panel 14 and the fibers therein are directed to the backs of the respective adapters 24 for those fibers on the patch panel 14.

Cable running internally to the frame 12B between one splice panel 16 and one patch panel 14 travels in the inner cable channels 46 and is not co-mingled with the cable running in outer cable channels 52. Excess cable running between splice and patch panels may be wrapped about the radius limiter 38, or may simply hang within the inner cable channels 46, as desired. This arrangement provides separate channels for connecting the cable 18 from the drawer 26 of each splice panel 16 to the external or customer equipment, and to its respective adapters 24 on a patch panel 14. This greatly facilitates the management of the cable 18 on the rear of the frame 12B, by separating cable runs into discrete channels, thereby making the cable 18 easier to identify and track from point to point.

In a typical configuration (such as that illustrated in FIG. 4), each splice panel 16 has eight splice drawers 26. Preferably, four fiber optic cables will be directed to each drawer 26, with each cable having 12 optical fibers therein. Two of those cables will be connected to external equipment, while the other two cables will run to one of the patch panels 14 within the frame 12B. If the two cables connected to the external equipment run along outer cable channel 52A for a particular drawer of the splice panel 16, then the two inner cables from that drawer will run along the inner cable channel 46A to one of the patch panels 14. Likewise, if the two cables to external equipment run along the outer cable channel 52B to a drawer of a splice panel 16, then the two cables running from that drawer to a patch panel 14 will extend along the inner cable channel 46B. While the cables running to and from external equipment necessarily crossover one of the inner cable channels 46 to reach the splice drawer 26, there is otherwise no co-mingling of cable among the inner and outer cable channels.

The optical fibers 20 of cable 18 running from the drawer 26 of the splice panel 16 to the patch panel 14 are each terminated at the back end of a adapter for each fiber on the patch panel 14. Patch or jumper cables 148 are provided which are connectable at their ends to the fronts of the adapters 24. The jumper cables 148 run between patch panels 14 along the front side of the frame in left and right front cable channels 106 and 108, as best seen in FIGS. 4, 6, 8, and 9. Front cable channels 106 and 108 are defined in part by frame mounting brackets 110 and 136 for the splice panel 16 and patch panel 14, respectively, and by cable guide pins 112 and 140.

The front cable channels 106 and 108 provide vertical channels for jumper cables 148 running from one patch panel 14 to another, or to receive excess jumper cable 148 therein. In addition, when the fiber distribution system 10 has more than one frame (such as the system shown in FIG. 1), the front cable channels 106 and 108 of each frame allow patching between adapters 24 of patch panels on separate frames 12 via frame connecting lateral troughs 22 and 28. Further, excess jumper cable 148 may be collected and stored in the interbay management frames, such as frames 12A and 12C.

Each rear extension 42, 43, 44 and 45 has the aperture 72 thereon, which is adapted for reception of a fastener 73 for mounting the rear cover 70 (FIG. 2) onto the splice panel 16 or the patch panel 14. The rear cover 70 is shown in dashed lines mounted to the rear extensions of the splice panel 16 in FIG. 8 and of the patch panel 14 in FIG. 9. The front cover 36 is mounted by a pair of hinges (not shown) to the chassis 96 of the splice panel 16 or the chassis 118 of the patch panel 14, and is selectively retained in its closed position by suitable fasteners. Preferably, the front cover 36 is transparent or translucent The front cover 36 is also shown in dashed lines in FIG. 8 and FIG. 9.

The splice panel mounting brackets 110 for the splice panel 16 are shown in FIG. 8. Each bracket 110 has a panel mounting segment 150, a frame mounting segment 152 and a channel defining segment 154. Apertures are provided in the panel mounting segment 150 for securing the mounting bracket 110 to the splice panel 16 by suitable fasteners. Apertures are also provided in the frame mounting segment 152 for attaching the mounting bracket 110 to the apertures 90 in one of the vertical members 74 or 76 of the frame 12B. Each mounting bracket 110 has one side door 34 attached thereto by a piano hinge 156, which is affixed at an outer free end of the channel defining segment 154. Two pins 112 are fastened to the frame mounting segment 152 of each bracket 110 and extend forwardly there from. The magnetic catch 114 (not shown) is fitted into the outer free end of each pin 112, and serves to magnetically catch the side door 34 in the closed position (as seen in FIG. 1). As seen in FIG. 8, the bases 66 of the radius limiters 40 serve to define the rear opening 116 along the rear of the splice panel 16 to accommodate the transfer of cables therethrough.

The patch panel mounting brackets 136 for the patch panel 14 are shown in FIG. 9. Each mounting bracket 136 has a panel mounting segment 158, a frame mounting segment 160 and the channel defining segment 138. Apertures are provided in the panel mounting segment 158 for securing the mounting bracket 136 to a patch panel 14 by suitable fasteners. Apertures are also provided in the frame mounting segment 160 for attaching the mounting bracket 136 to the apertures 90 in one of the vertical members 74 or 76 of the frame 12B. As seen in FIGS. 1, 6, and 9, each mounting bracket 136 has the side door 34 attached thereto by a piano hinge 162, which is affixed to an outer free end of the channel defining segment 138. Seven pins 140 are fastened to the frame mounting segment 160 of each bracket 136 and extend forwardly therefrom. Top and bottom pins 140 have the magnetic catch 142 fitted into the outer free end of each pin 140 which serves to magnetically catch the side door 34 in its closed position (as seen in FIG. 1).

Figure 10:
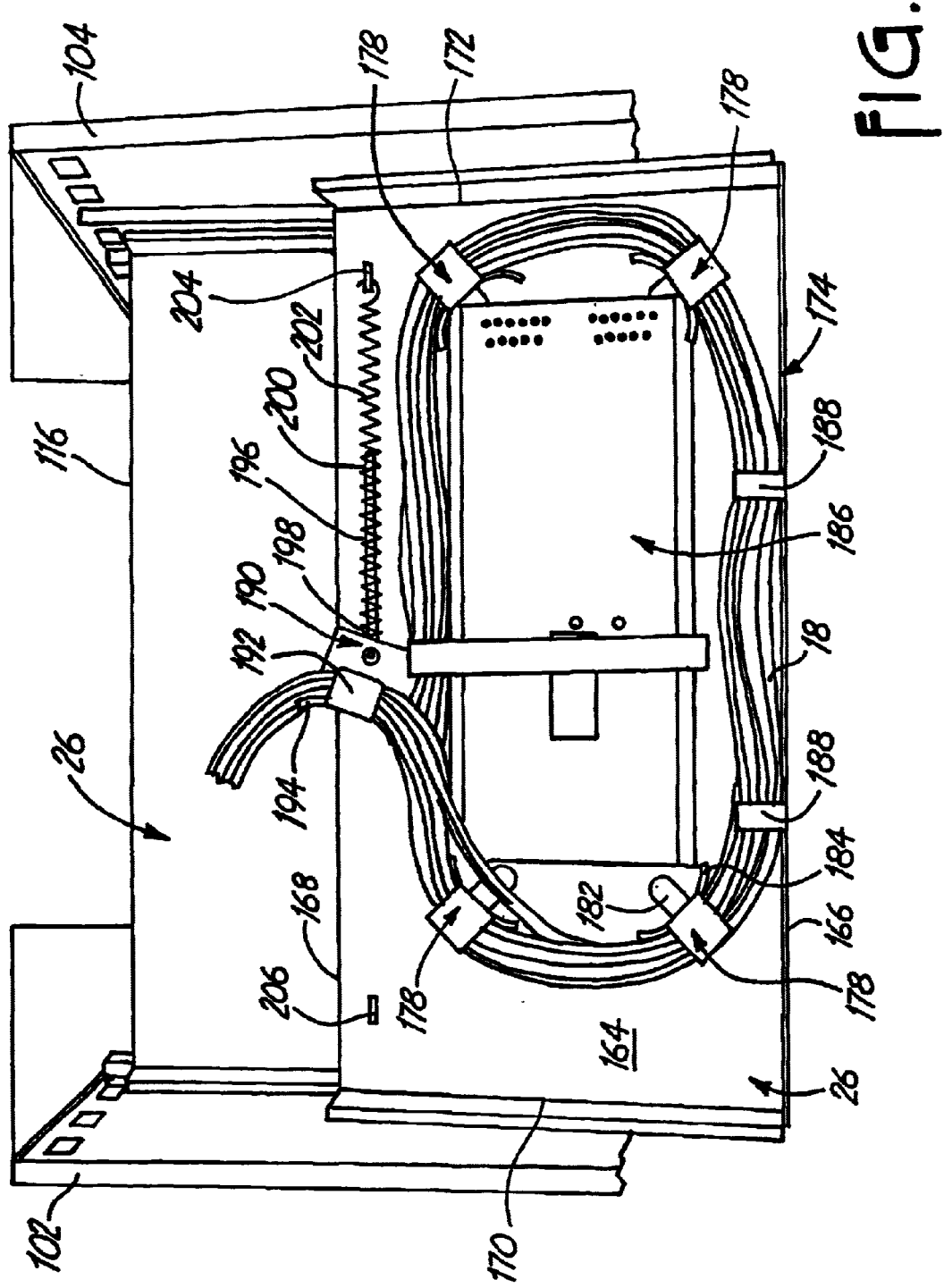
FIG. 10 is a top view of a first embodiment of a splice drawer in the open position.
Figure 11:
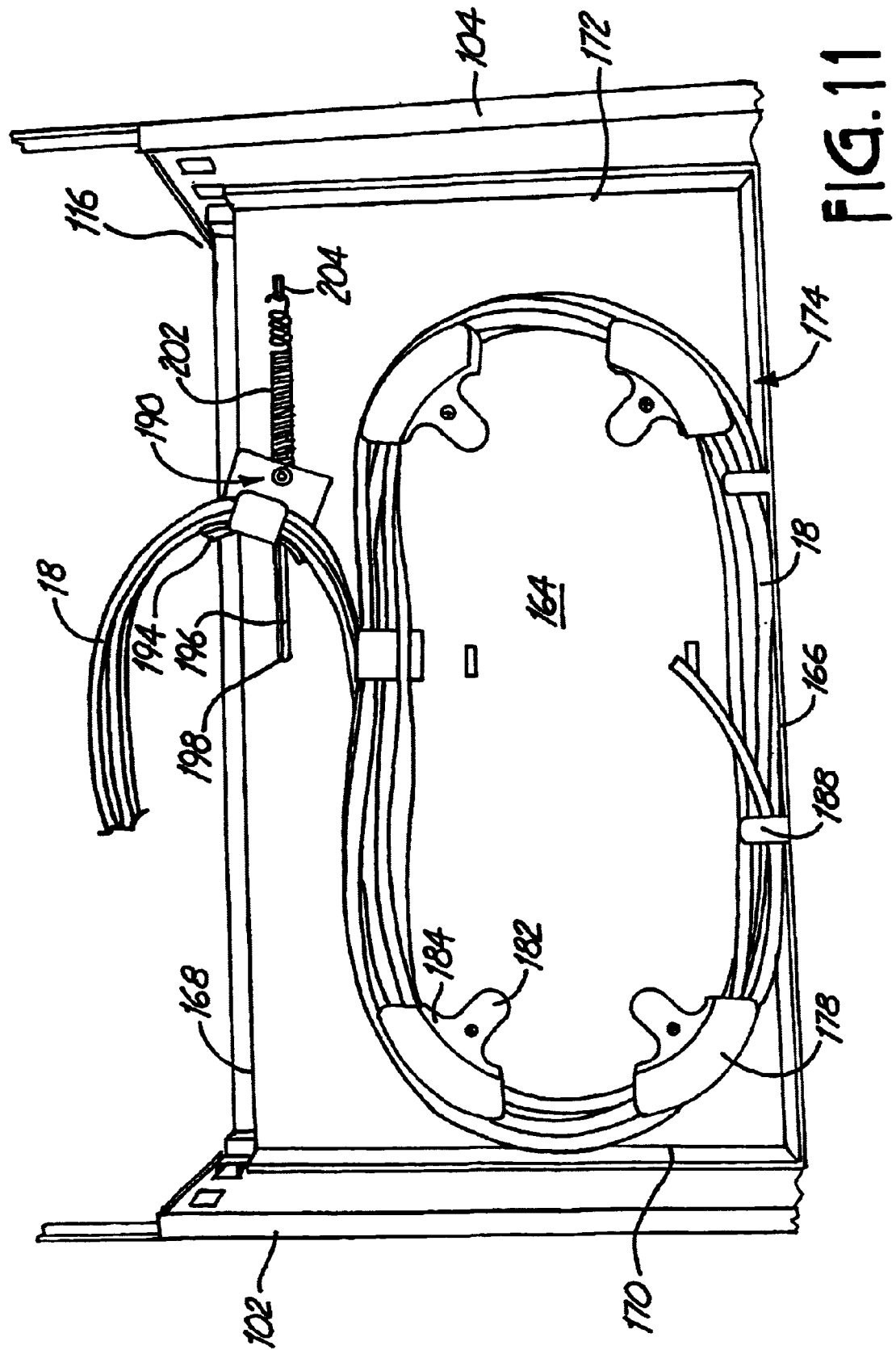
FIG. 11 is a top view of the first embodiment of the splice drawer in the closed position.

FIG. 10 is a top view of a first embodiment of the splice drawer 26 in the closed storage position and FIG. 11 is a top view of the first embodiment of the splice drawer 26 in the open use position storage. Each splice drawer 26 has a base 164, defined by a front edge 166, a rear edge 168, and opposed first and second side edges 170 and 172. At its front edge 166, each drawer 26 has an upwardly extending lip or front panel 174. To facilitate opening of the drawer 26, the front lip 166 may also be provided with a finger opening 176 (see FIG. 4).

A plurality of cable management tabs 178 are disposed about the base 164 of the splice drawer 26 and mounted with a suitable fastener to apertures. Preferably, four cable management tabs 178 are provided. The tabs 178 are comprised of a base 182, attached to the base 164, with a plastic rounded guide element 184 attached to the base 182. A splice tray 186 is disposed or mounted on the base 164 to facilitate splicing of the fiber optic cables 18 carried by the drawer 26. Preferably, the four tabs 178 are located adjacent the four corners of the splice tray 186 such that the tabs 178 encircle the splice tray 186. To accommodate different user desires and splice tray configurations, different preselected locations for apertures may be provided on the base 164 to allow selected positioning of the cable management tabs 178. Although the splice tray 186 and cable management tabs 178 are shown centered in the drawer 26, they may be moved to the left or right of the splice drawer. Other cable management tabs 188 are also shown on the base 164 of the splice drawer 26, depending rearwardly from the front lip 174 adjacent the front edge 166 of the base 164. Tabs 188 provide another means for holding the cables in place.

Attentively, the cable management tabs 178 may be cut and bent out of the base 164 of the splice drawer 26. Separately formed cable management tabs 178 are provided and then affixed to the base 164 by suitable fasteners, such as rivets through preformed apertures. Each of the preformed tabs 178 are also provided with plastic rounded cable management guides 184.

Cables 18 enters the back of the splice drawer 26 through the rear opening 116 of the splice panel 16. The cables 18 for each drawer 26 are first directed about a slack take-up member 190 which, in one embodiment, is a bent metal member 192 with a plastic rounded cable management guide 194 attached thereto. A slot 196, or guide member, is formed in the base 164 of the drawer 26. Although the slot is shown as linear, other configurations including an arc or curves, and other forms of guides (other than slots) for the slack take-up member 190 are contemplated. Preferably, the slot 196 extends from side-to-side adjacent the rear edge 168 of the drawer 26. The slot 196 has a first end 198 and a second end 200.

The slack take-up member 190 is formed to track the slot 196 and to move along the slot 196. Preferably the take-up member 190 is mounted within the slot 196 adjacent the second end 200. A tension spring or other suitable bias member 202 is provided, and has one end mounted to the slack take-up member 190 and its other end attached to a mounting element 204 on the base 164. Preferably the mounting element is located adjacent the second end 200 of the slot 196. The slack take-up member 190 slides within the slot 196 from a second position about at the second end 200, when the drawer is in the closed position, to a first position about at a center of the drawer 26, when the drawer is in the open position. However, the take-up member may also be mounted within the slot 196 adjacent the first end of the slot 196.

As illustrated in FIG. 11, the spring 202 provides tension to bias the slack take-up member 190 against movement away from the mounting element 204. However, as the drawer 26 is moved in and out of the splice panel 122, the cables 18 place forces on the slack take-up member 190. Those forces act contrary to the spring forces of the spring 202 to maintain the position of the cables 18 without excess slack and in position for orderly opening and dosing of the drawer 26 without potential damage to the cables 18.

This sliding slack take-up arrangement is thus provided for taking up excess cable within an individual splice drawer while retaining and preventing the cable from bending to a degree which would otherwise damage the optical fiber. The curvature for the guide element of the slack take-up member in contact with the cable is selected to have a radius of curvature greater than the minimum radius which would other result in possible damage to an optical fiber.

When the splice drawer is in its closed storage position (FIG. 10), the take-up member is preferably in the second position. When the drawer 26 is closed, the spring 202 biases the slack take-up member 190 to the second position towards the second side edge 172, to take-up slack on the cables 18. When an operator desires to perform maintenance on a splice, the splice drawer 26 is pulled to its open use position as shown in FIG. 11. As the drawer 26 is pulled open, the slack take-up member 190 may move along the slot 196 to the first position towards the first edge 170 and about in the center of the drawer 26. The slack take-up function thus takes place perpendicular to the motion of the drawer.

The drawer 26 has an opposite identical spring mounting element 206 adjacent the rear edge 168 and the first end 198 of the slot 196. Thus, the spring 202 can also be mounted to bias the slack take-up member 190 to the left, towards the first edge 170, if desired. Each splice drawer 26 in the splice panel 16 can thus be set up to allow cable entry from either side of the splice panel, and, if desired, the orientation can be reversed for a particular drawer by user choice. In FIGS. 10 and 11, for example, the cables enter the splice drawer 26 from the right side of the splice panel 16 (as viewed from the front) or from the left side of the splice panel 16 (as viewed from the rear).

For any particular splice panel 16, it is not necessary that all cables be fed to and from its splice drawers from only one side of the back of the panel. The cables for each drawer may, for instance, be directed to alternate drawers from the left and right sides of the back of a splice panel 16, which significantly reduces the congestion on one side of the back of frame by distributing the cables along both sides thereof. This further allows easier access, management and tracking of cables in the inventive system.

Prior art splice panels only permitted entry of cable into the backs thereof from one side for all of the drawers in each splice panel. This configuration resulted in all of the external cable extending along one-side of the rear of the system for each splice panel, which presented cable management and tracking problems. The inventive splice panel 16 thus provides a highly versatile and flexible modular component for use in the fiber distribution system of the present invention. Cable can be directed in and out of a particular drawer in the splice panel 16 from either side of the back of the splice panel 16 and protected by radius limiter 40 (for cable being directed to or from a patch panel 14) and radius limiter 54 (for cable being directed to or from external equipment). The slack take-up member 190 with generally side-to-side movement and biased to take up cable slack as the drawer is placed in its closed storage position, further prevents damage to the optical fibers in the cable, in a highly efficient and exquisitely simple manner.

Figure 10A:
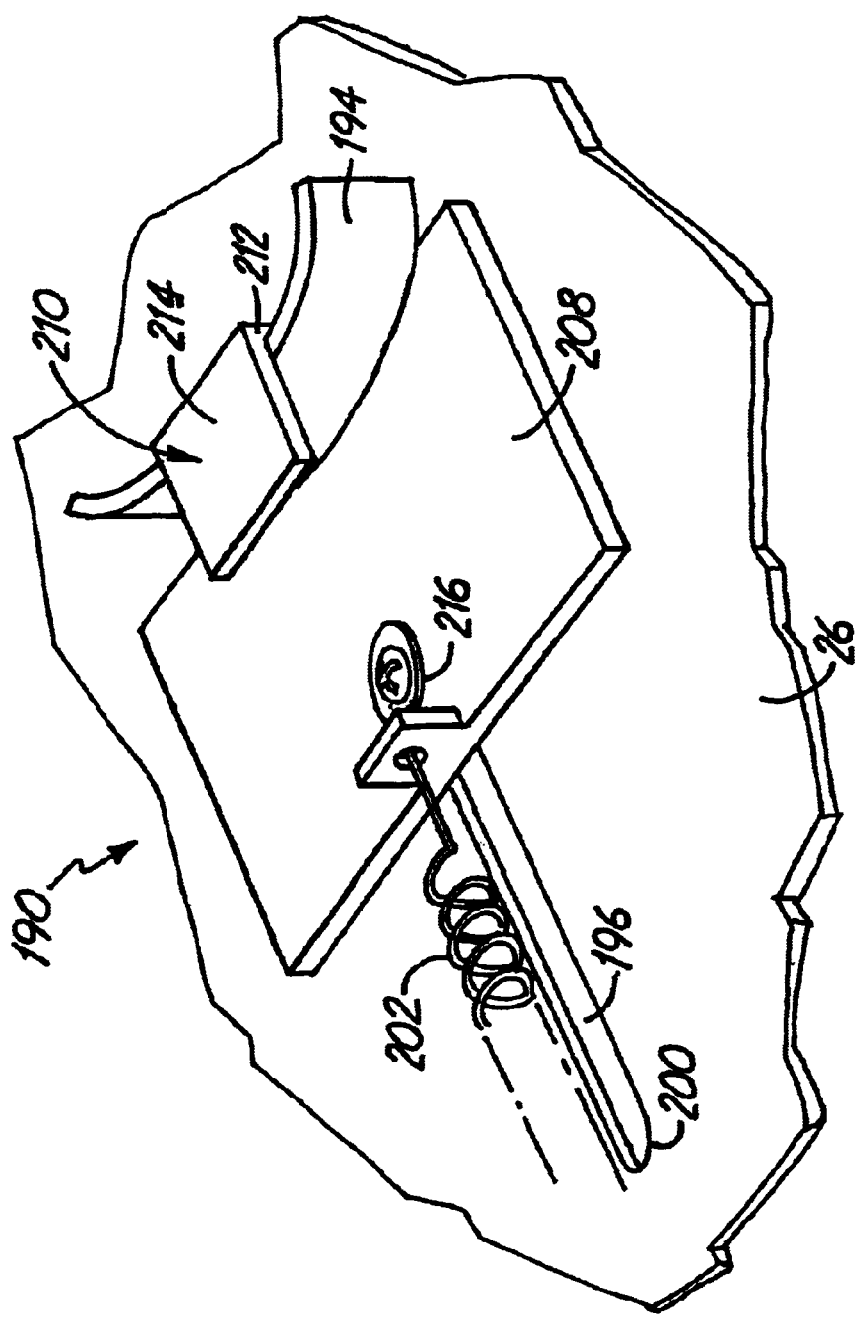
FIG. 10A is a side view of an inventive take-up member in the open position.
Figure 11A:
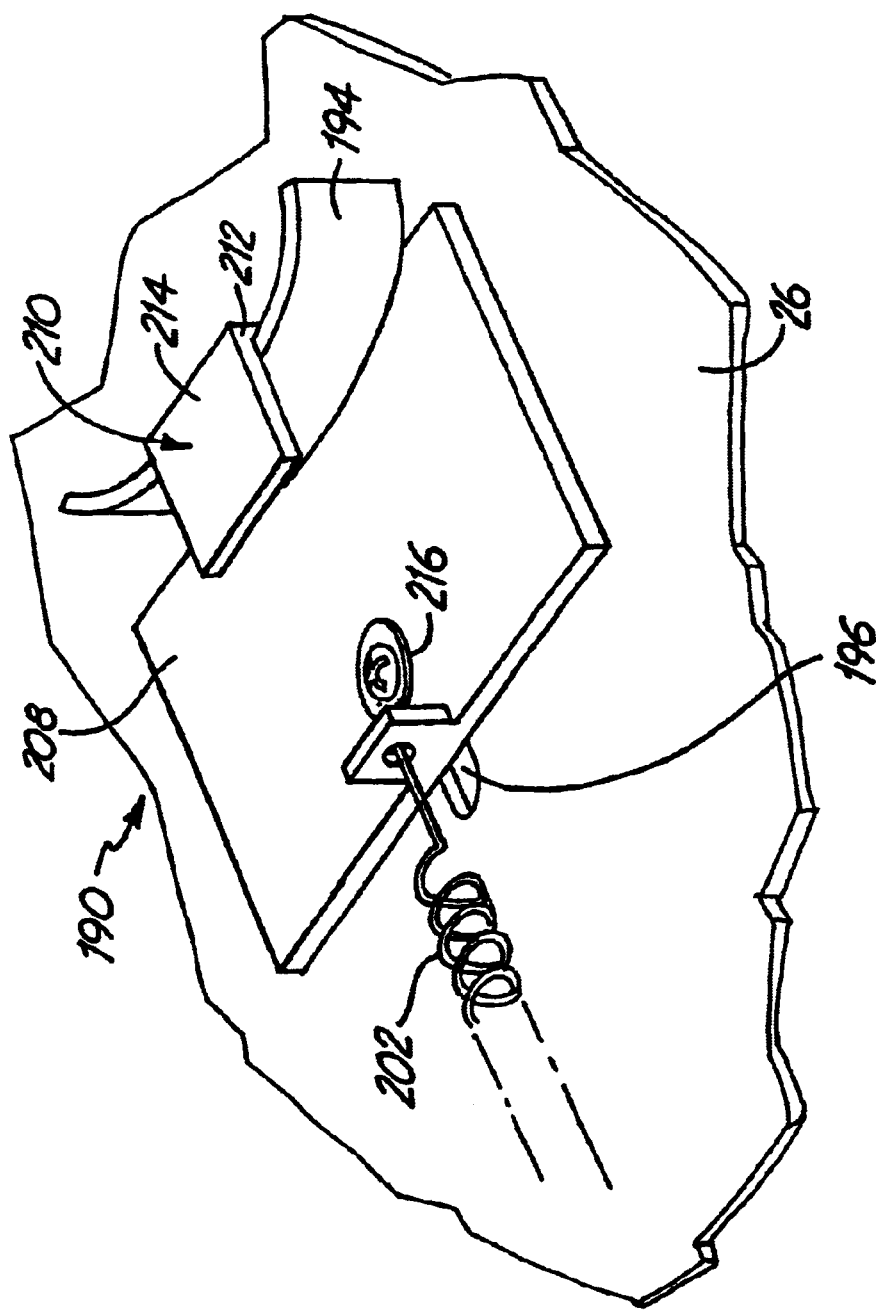
FIG. 11A is a side view of the inventive take-up member in the closed position.

FIG. 10A is a side view of the first embodiment of the slack take-up member 190 in the second position, and FIG. 11A is a side view of the first embodiment of the slack take-up member 190 is the first position. A base 208 of the slack take-up member 190 has an upstanding support member 210 for receiving the rounded guide element 184. The support member 210 is comprised of a shoulder 212 extending substantially perpendicular from the base and an arm 214 extending substantially perpendicular from the shoulder 212. The arm 214 also serves to retain the cable in place. A link 216 is provided to engage one end of the spring 202.

The base 208 has a pin (not shown) or other depending member affixed thereto which extends through the slot 196 and has a head or other enlarged portion on a bottom thereof, which provides the means for maintaining the slack take-up member 190 in the slot 196, but allows its movement along the slot 196 as needed. The slack take-up member 190 pivots about the pin in the slot 196 to accommodate cable movement, and also to allow the reversal of side-to-side orientation of the slack take-up member 190 within an individual drawer 26 (by selected attachment of the spring 202 on either of the mounting elements 204 or 206).

As seen in FIG. 10A, when the splice drawer is in its closed storage position, the slack take-up member 190 is preferably in the second position. The spring 202 biases the slack take-up member 190 towards the second edge 172 of the splice drawer 26, to take-up slack on the cables 18. As seen in FIG. 11A, when an operator desires to perform maintenance on a splice, the splice drawer 26 is pulled to its open use position. The slack take-up member 190 moves along the slot 196 to the first position towards the first edge 170 of the splice drawer 26 and the spring 202 extends.

Figure 12:
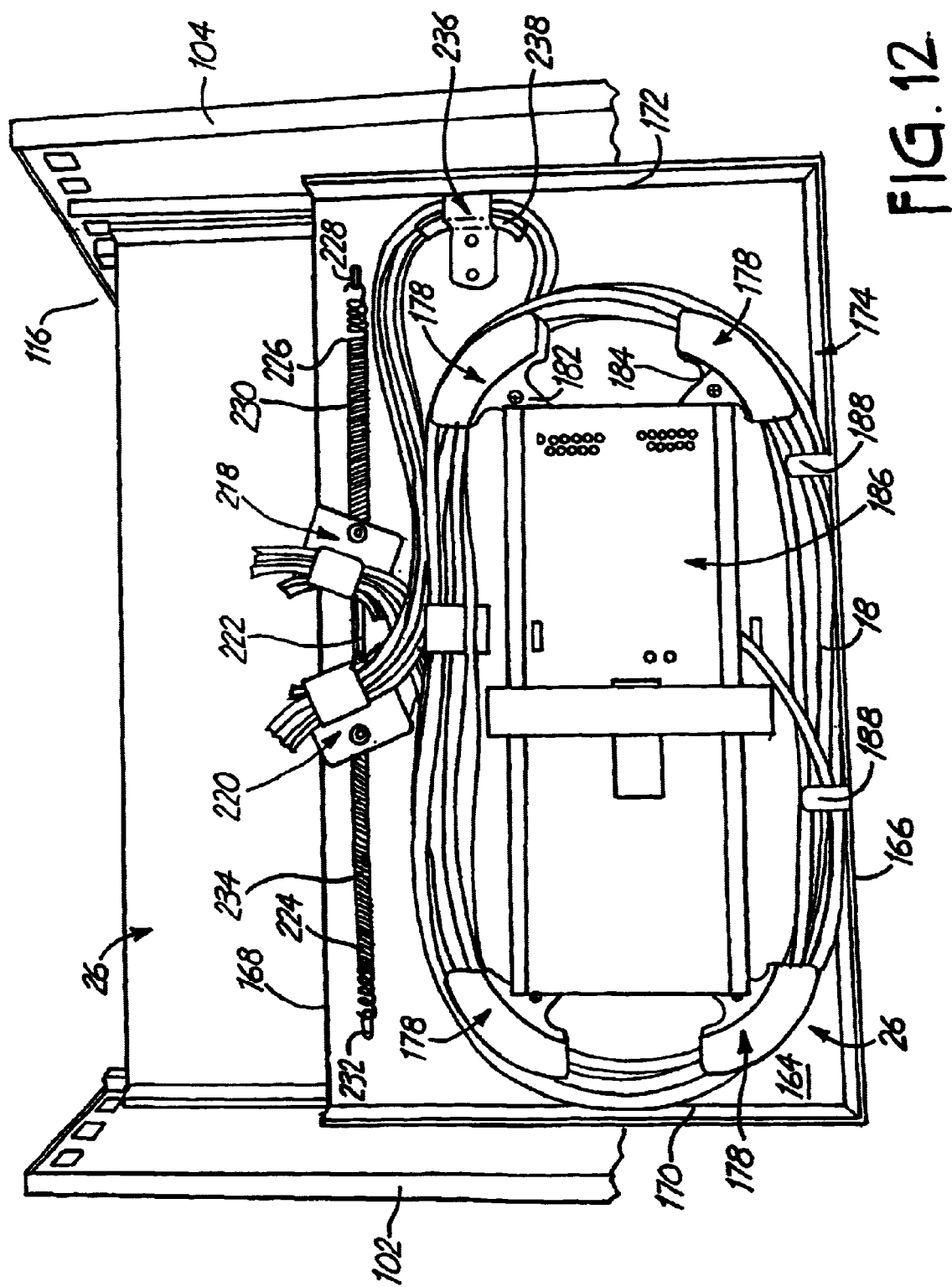
FIG. 12 is a top view of a second embodiment of the splice drawer in the open position.
Figure 13:
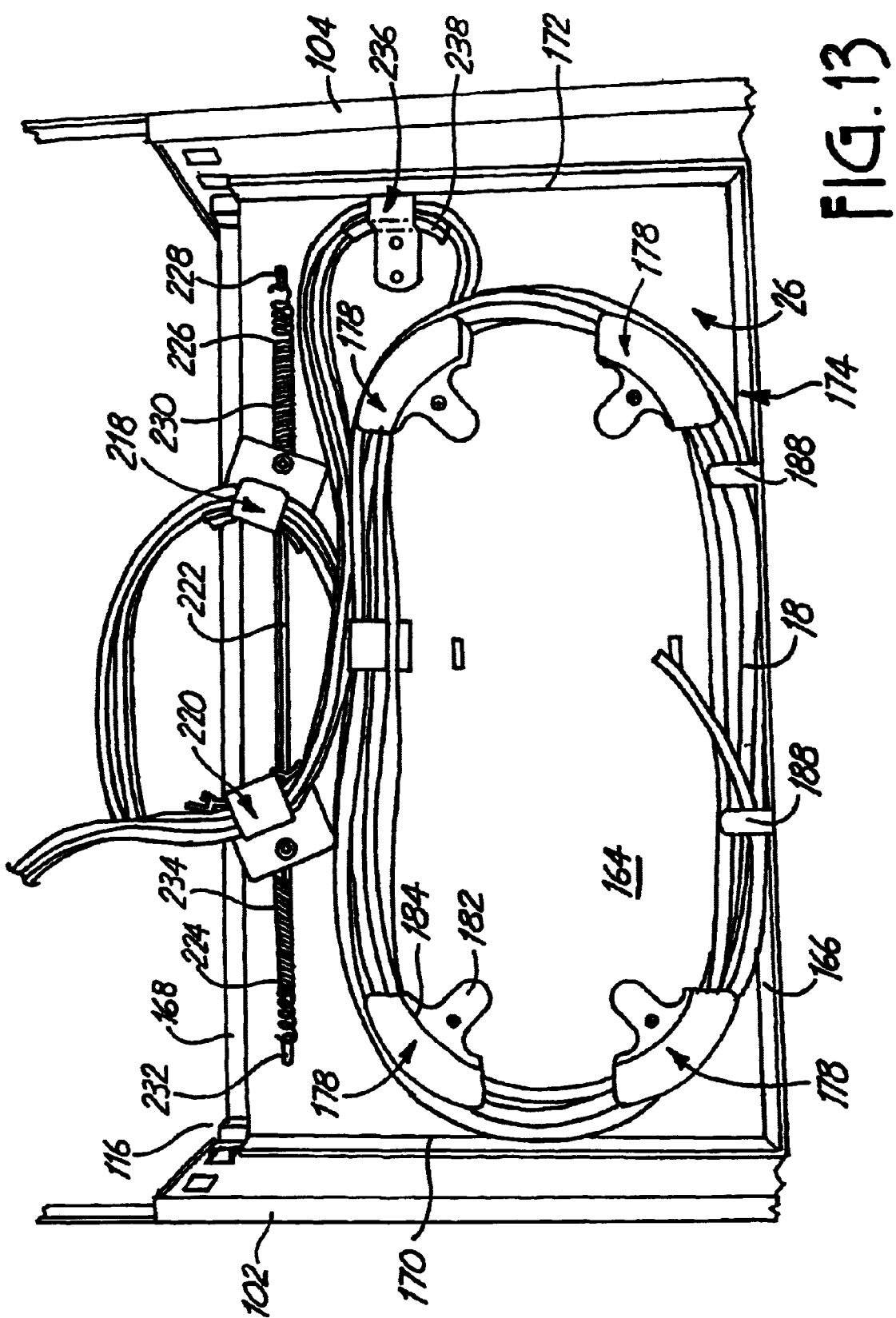
FIG. 13 is a top view of the second embodiment of the splice drawer in the closed position.

FIG. 12 shows a top view of a second embodiment of the splice drawer 26 in the closed storage position and FIG. 13 shows a top view of the second embodiment of the splice drawer 26 in the open use position. The second embodiment of the splice drawer 26 includes a dual take-up member system. The dual take-up member system includes a first slack take-up member 218 and a second slack take-up member 220. The dual take-up member system allows cable to enter the splice drawer 26 from both sides of the splice panel 16. Cable can be directed in and out a particular splice drawer in the splice panel 16 from both sides of the back of the splice panel 16 and protected by the radius limiter 40 (for cable being directed to or from a patch panel 14) and radius limiter 54 (for cable being directed to or from external equipment). This configuration allows the external cable to extend along both sides of the rear of the frame for each splice panel. After the cable 18 enters the splice drawer 26, the cable is directed about either the first slack take-up member 218 or the second slack take-up member 220.

Preferably, four cable management tabs 178 are disposed about the base 164 of the splice drawer 26. The four tabs 178 are located adjacent the four corners of the splice tray 186 so that the tabs 178 encircle the splice tray 186. The splice tray 186 is preferably centered in the splice drawer 26. However the splice tray 186 and thus the cable management tabs 178 may be moved to the left or the right of the splice drawer depending on where the second slack take-up member 220 is located.

A slot 222 is formed in the base 164 of the splice drawer 26 adjacent the rear edge 168 and extending between the first side edge 170 and the second side edge 172. The slot 222 has a first end 224 and a second end 226. The first end 224 of the slot 222 is adjacent the first side edge 170 and the second end 226 of the slot 222 is adjacent the second side edge 172. Although the slot 222 is shown as linear, other configurations, and other forms of guides (other than slots) for the slack take-up members 218 and 220 are contemplated. The first and second slack take-up members 218 and 220 are formed to attach to the slot 222 and to move along the slot 222.

The first slack take-up member is configured to operate similar to the slack take-up member 190 of the first embodiment. The first slack take-up member 218 is mounted within the slot 222 to slide from about the second end 226 of the slot 222 (the second position) to about the center of the slot 222 (the first position). A first mounting element 228 is located on the base 164 of the splice drawer 26 adjacent the second end 226 of the slot 222. A tension spring or other suitable bias member 230 is provided and has one end mounted to the first slack take-up member 218 and the other end attached to the first mounting element 228. A portion of the cable entering the splice drawer 26 loops around the guide element 194 of the first slack take-up member and then continues in a counter-clockwise direction around the cable management tabs 178 before entering the splice tray 186. As seen in FIG. 12, when the drawer 26 is in the closed position, the spring 230 biases the first slack take-up member 218 to the second position towards the second edge 172 to take up slack on the cables. As the drawer 26 is pulled open (as seen in FIG. 13), the first slack take-up member 218 may move along the slot 222 to the first position towards the first edge 170 and about in the center of the slot 222. The slack take-up function thus takes place perpendicular to the motion of the drawer. As the drawer 26 is moved in and out of the splice panel 16, the cables 18 place forces on the first slack take-up member 218 and thus those forces act contrary to the spring forces of the spring 230 to maintain the position of the cables 18 without excess slack and in position for opening and closing of the drawer 26 without potential damage to the cables 18.

The second slack take-up member 220 is formed to track the slot 222 and to move along the slot 222 from the first end 224 (the second position) to about the center of the slot 222 (the first position). A second mounting element 232 is formed on the base 164 of the drawer 26 adjacent the first end 224. A tension spring (or other suitable bias member) 234 is provided and has one end mounted to the second slack take-up member 220 and its other end attached to the second mounting element 232. A side cable management tab 236 having a guide element 238, is mounted to the base 164 adjacent the first side edge 170 and the rear edge 168. As a portion of the cable 18 enters the splice drawer 26, the cable loops around the guide element 194 of the second slack take-up member 220. The cable than passes around the cable management tab 236 before continuing to loop around the cable management tabs 178 in the counter-clockwise direction and entering the splice tray 186.

When the drawer 26 is closed (as seen in FIG. 12), the spring 234 biases the second slack take-up member 220 towards the first edge 170 of the drawer 26, the second position, to take up slack in the cables 18. When the splice drawer 26 is pulled to its open position (as seen in FIG. 13), the second slack take-up member 220 may move along the slot 222 towards the second edge 172 of the splice drawer 26 and about in the center of the slot 222, the first position.

This dual slack take-up system is provided for taking up excess cable within an individual splice drawer while retaining and preventing the cable from bending to a degree which would otherwise damage the optical fiber. The curvature for the guide element of the slack take-up members in contact with the cable is selected to have a radius of curvature greater than the minimum radius which would otherwise result in possible damage to an optical fiber.

Each splice drawer 26 and the splice panel 16 can be set up to allow cable entry from both sides of the back thereof. In FIGS. 12 and 13, the cable enters the splice drawer 26 from both sides of the splice panel 16. Thus, for any particular splice panel 16 it is not necessary that all cables be fed to and from the drawers from only one side of the back of the panel. The cables for each drawer may, for instance be directed to alternate drawers from both the left and the right sides of the back of the splice panel 16, which significantly reduces the congestion on one side on the back of the system 10 by distributing the cables along both sides. This further allows easier access, management interacting with cables in the inventive system.

Figure 14:
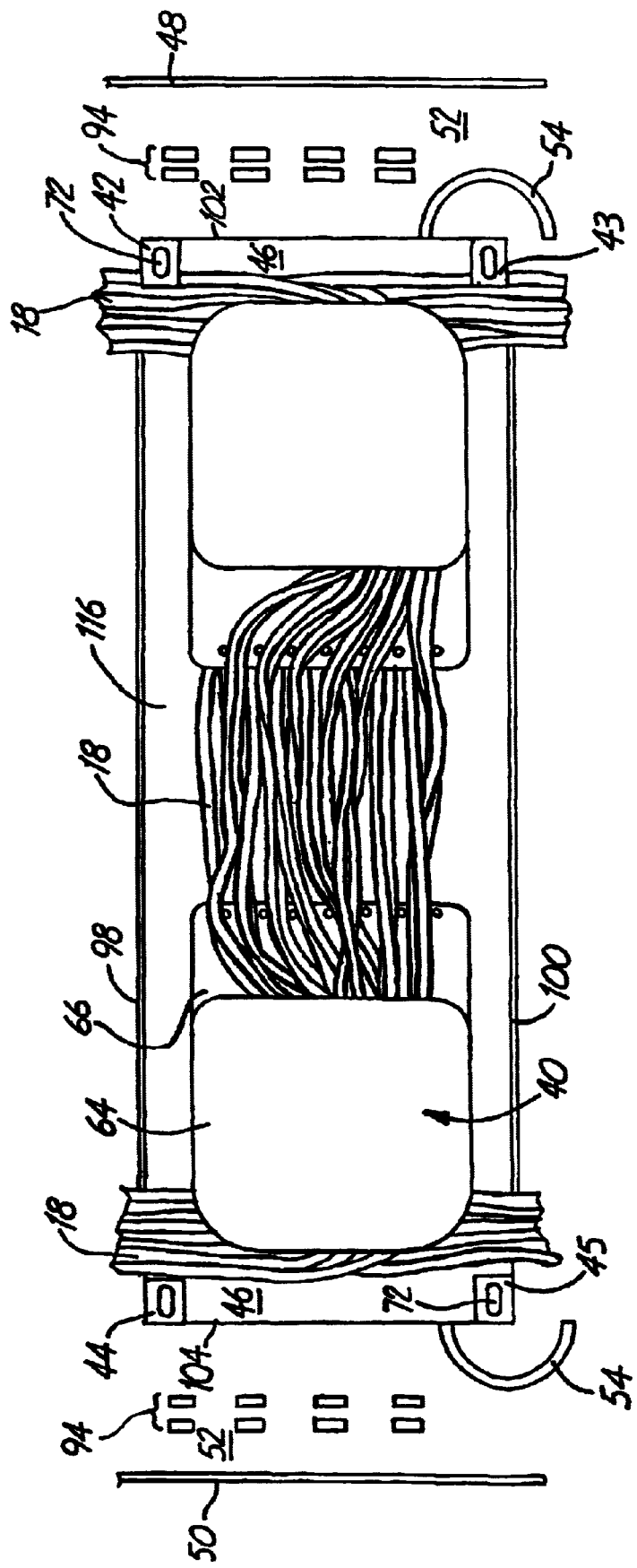
FIG. 14 is a rear view of the splice panel with the splice drawer of the second embodiment While the above-identified drawing figures set forth several embodiments of the inventions, other embodiments are also contemplated, as noted in the discussion. In all cases, this disclosure presents the present invention by way of representation and not limitation. It should be understood that numerous other modifications and embodiments can be devised by those skilled in the art which fall within the scope and spirit of the principles of the invention.

FIG. 14 is a rear view of the splice panel 16 having the splice drawer 26 of the second embodiment with a dual slack take-up system. The cable 18 enters the rear opening 116 of the splice panel 16 from both directions. The cable 18 travels through either the inner or outer cable channels and over the radius limiters 40 and 54 into the splice drawer 26.

The inventive fiber distribution system of the present invention provides a much more versatile cable management scheme and method of cable management than was previously attainable, by separating cable runs interiorly and exteriorly from the system. This arrangement provides superior cable sorting and routing paths, while still being extremely user friendly and accessible from the front and back of the system, as well as providing the highest degree of cable safety and kink prevention integrity.

As may be appreciated, tracking a particular fiber optic cable through this connection scheme requires careful tracking and some orderly management of the cable and its fiber leads. The present invention is directed to enhancing the ability to manage that cable and ease in its identification, handling and user manipulation thereof, while maintaining the highest possible density of cable interface and system flexibility. These goals are attained by a variety of techniques in the present system. Primary among these are the cable management techniques which are employed generally in the present inventive system.

The splice panel of the present invention permits cable to enter the splice drawer from either side, or both sides of the splice panel for all drawers. Thus, cable management and tracking is made much easier. The sliding slack take-up system of the present invention, and provided in each drawer, takes up excess cable within an individual splice drawer while protecting the cable from bending or kinking and damaging the optical fiber.

Although the present invention has been described with reference to preferred embodiments, workers skilled in the art will recognize that changes may be made in form and detail without departing from the spirit and scope of the invention.

What is claimed is:

1. A splice drawer for slidably mounting in a splice panel for use in a fiber distribution system wherein the splice drawer is slidable between a closed position fully within the splice panel and an open position extending from the front of the splice panel, the splice drawer comprising:
   a drawer frame having a bottom, a front, a rear, first and second sides and a longitudinal axis;
   an opening in the rear of the splice drawer for admitting cables;
   at least one splice tray disposed within the splice drawer for holding splices between optical fibers forming the cable; and
   a first take-up member mounted in the splice drawer, the first take-up member being biased toward the second side of the splice drawer to slidably travel between a first position proximate the longitudinal axis of the splice drawer when the splice drawer is in the open position and a second position adjacent the second side of the splice drawer when the splice drawer is in the closed position wherein cable entering the opening passes through the first take-up member.

2. The splice drawer of claim 1, and further comprising:
   a plurality of guide elements attached to the drawer and encircling the splice tray wherein cable passing through the first take-up member passes along the guide elements before entering the splice tray.

3. The splice drawer of claim 1, and further comprising:
   a slot formed in the bottom of the splice drawer, the slot extending from the first side of the splice drawer to the second side of the splice drawer and the slot having a first end and a second end wherein the first take-up member is slidably mounted within the slot.

4. The splice drawer of claim 3, wherein the splice drawer includes a first mounting element attached to the splice drawer proximate the second end of the slot and the first take-up member further comprises:
   a base slidably mounted relative to the slot;
   a support member extending from the base wherein the support member has a shoulder extending substantially perpendicular from the base and an arm extending substantially perpendicular from the shoulder;
   a rounded guide attached to the support member;
   a base mounting element attached to the base; and
   a first bias member extending between the base mounting element and the first mounting element wherein the first bias member biases the first take-up member toward the first position.

5. The splice drawer of claim 3, and further comprising:
   a second take-up member slidably mounted to the slot, the second take-up member being biased toward the first side of the splice drawer to slidably travel between a first position proximate the longitudinal axis of the splice drawer when the splice drawer is in the open position and a second position adjacent the first side of the splice drawer when the splice drawer is in the closed position wherein a portion of cable entering the opening passes through the second take-up member.

6. The splice drawer of claim 5 wherein the splice drawer includes a second mounting element attached to the splice drawer proximate the first end of the slot and the second take-up member further comprises:
   a base slidably mounted relative to the slot;
   a support member extending from the base wherein the support member has a shoulder extending substantially perpendicular from the base and an arm extending substantially perpendicular from the shoulder;
   a rounded guide attached to the support member;
   a base mounting element attached to the base; and
   a second bias member extending between the base mounting element and the second mounting element wherein the second bias member biases the second take-up member toward the first position.

7. The splice drawer of claim 6 further comprises a side guide element attached to the splice drawer adjacent the second side wherein cable passing through the second take-up member loops around the side guide element before passing along the guide elements to enter the splice tray.

8. In a splice drawer of the type for slidably mounting in a splice panel for use in a fiber distribution system wherein the splice drawer is slidable between a closed position fully within the splice panel and an open position extending from the front of the splice panel, the splice drawer having a front, a rear, a first side, a second side and an opening in the rear of the drawer for admitting cables, the improvement which comprises:
   a first take-up member mounted in the splice drawer, the first take-up member being biased toward the second side of the splice drawer to slidably travel between a first position proximate a longitudinal axis of the splice drawer when the splice drawer is in the open position and a second position adjacent the second side of the splice drawer when the splice drawer is in the closed position wherein cable entering the opening passes through the first take-up member.

9. The improvement of claim 8, and further comprising:
   a slot formed in the bottom of the splice drawer, the slot extending from the first side of the splice drawer to the second side of the splice drawer and the slot having a first end and a second end wherein the first take-up member is slidably mounted within the slot.

10. The improvement of claim 9 wherein the splice drawer includes a first mounting element attached to the splice drawer proximate the second end of the slot and the first take-up member further comprises:
    a base slidably mounted relative to the slot;
    a support member extending from the base wherein the support member has a shoulder extending substantially perpendicular from the base and an arm extending substantially perpendicular from the shoulder;
    a rounded guide attached to the support member;
    a base mounting element attached to the base; and
    a first bias member extending between the base mounting element and the first mounting element wherein the first bias member biases the first take-up member toward the first position.

11. The improvement of claim 8, and further comprising:
    a second take-up member slidably mounted to the slot, the second take-up member being biased toward the first side of the splice drawer to slidably travel between a first position proximate the longitudinal axis of the splice drawer when the splice drawer is in the open position and a second position adjacent the first side of the splice drawer when the splice drawer is in the closed position wherein a portion of cable entering the opening passes through the second take-up member.

12. The improvement of claim 11 wherein the splice drawer includes a second mounting element attached to the splice drawer proximate the first end of the slot and the second take-up member further comprises:
    a base slidably mounted relative to the slot;
    a support member extending from the base wherein the support member has a shoulder extending substantially perpendicular from the base and an arm extending substantially perpendicular from the shoulder;
    a rounded guide attached to the support member;
    a base mounting element attached to the base; and
    a second bias member extending between the base mounting element and the second mounting element wherein the second bias member biases the second take-up member toward the first position.

13. The improvement of claim 12, further comprises a side guide element attached to the splice drawer adjacent the second side wherein cable passing through the second take-up member loops around the side guide element before passing along the guide elements to enter the splice tray.

14. A method for taking up slack in cable entering a splice drawer in a fiber distribution system wherein the fiber distribution system includes a splice panel having a plurality of splice drawers slidable between a closed position fully within the splice panel and an open position extending from the front of the splice panel, the method comprising:
    providing a splice drawer having a bottom, a rear and first and second sides wherein an opening is formed in the rear of the splice drawer;
    providing a take-up member slidably mounted to the bottom of the splice drawer, wherein the take-up member is slidable between a first position and a second position; and
    routing cable through a rear opening in the splice drawer, through the take-up member, and into a splice tray holding splices between optical fibers, wherein when the splice drawer is in the open position the take-up member is biased towards the first position about in a center of the splice drawer to allow cable slack and when the splice drawer is in the closed position the take-up member slides to a second position adjacent the second side of the drawer to take up cable slack.

15. The method of claim 14, and further comprising:

forming a slot on the bottom of the splice drawer adjacent the rear and extending from the first side to the second side wherein the first take-up member is mounted to the slot.

16. The method of claim 14, wherein a bias member extends between the first take-up member and a first mounting element on the bottom of the splice drawer biases the first take-up member towards the first position.

17. The method of claim 14, and further comprising:

providing a second take-up member slidably mounted to the bottom of the splice drawer wherein the second take-up member is biased towards the first side of the splice drawer to slidably travel between a first position about in the center of the splice drawer to allow cable slack when the splice drawer is in the open position and a second position adjacent the first side of the drawer to take up cable slack when the drawer is in the closed position.

18. The method of claim 17 wherein a bias member extends between the second take-up member and a second mounting element on the bottom of the splice drawer biases the second take-up member towards the first position.

19. The method of claim 17, and further comprising:

routing a portion of the cable through the rear opening into the splice drawer, about the second take-up member, about a guide element attached to the bottom of the drawer, and into the splice tray holding splices between optical fibers.

* * * * *

UNITED STATES PATENT AND TRADEMARK OFFICE
CERTIFICATE OF CORRECTION

PATENT NO. : 6,707,978 B2
DATED : March 16, 2004
INVENTOR(S) : George L. Wakileh et al.

It is certified that error appears in the above-identified patent and that said Letters Patent is hereby corrected as shown below:

Title page,
Item [57], ABSTRACT,
Line 9, delete "bolding" insert -- holding --

Column 3,
Line 34, delete "backside" insert -- back side --

Column 5,
Line 3, delete "attentively" insert -- alternatively --

Column 9,
Line 7, delete "dips" insert -- clips --
Line 23, delete "128", insert -- 12B --
Line 44, delete "emend" insert -- extend --

Column 12,
Line 13, delete "Attentively" insert -- Alternatively --
Line 56, delete "dosing" insert -- closing --

Column 15,
Line 18, delete "dosing" insert -- closing --

Signed and Sealed this

Twenty-first Day of December, 2004

JON W. DUDAS
*Director of the United States Patent and Trademark Office*